US011891971B2

(12) United States Patent
Saito et al.

(10) Patent No.: US 11,891,971 B2
(45) Date of Patent: Feb. 6, 2024

(54) DROPLET EJECTOR

(71) Applicants: Fuminori Saito, Koganei (JP); Tokihiro Ikeda, Saitama (JP)

(72) Inventors: Fuminori Saito, Koganei (JP); Tokihiro Ikeda, Hiki-gun (JP); Shinji Tamura, Tokoroawa (JP)

(73) Assignees: Fuminori Saito, Tokyo (JP); Tokihiro Ikeda, Saitama (JP)

( * ) Notice: Subject to any disclaimer, the term of this patent is extended or adjusted under 35 U.S.C. 154(b) by 31 days.

(21) Appl. No.: 17/420,744

(22) PCT Filed: Dec. 26, 2019

(86) PCT No.: PCT/JP2019/051205
§ 371 (c)(1),
(2) Date: Jul. 6, 2021

(87) PCT Pub. No.: WO2020/145184
PCT Pub. Date: Jul. 16, 2020

(65) Prior Publication Data

US 2022/0065210 A1 Mar. 3, 2022

(30) Foreign Application Priority Data

Jan. 8, 2019 (JP) ................................ 2019-001495

(51) Int. Cl.
*F02M 69/04* (2006.01)
*F02M 51/08* (2006.01)
*F02M 27/04* (2006.01)

(52) U.S. Cl.
CPC .......... *F02M 69/041* (2013.01); *F02M 27/04* (2013.01); *F02M 51/08* (2019.02)

(58) Field of Classification Search
CPC ....... F02M 69/041; F02M 27/04; F02M 51/08
See application file for complete search history.

(56) References Cited

U.S. PATENT DOCUMENTS 4,168,803 A * 9/1979 Simmons .............. F23D 11/107 60/734
4,696,279 A * 9/1987 Lindberg ............... F02M 26/19 123/25 E (Continued)

FOREIGN PATENT DOCUMENTS

CN 110080915 A * 8/2019 ......... F02D 41/0025
CN 111677609 A * 9/2020

(Continued)

OTHER PUBLICATIONS

Miatumoto, "Fuel injection system for diesel passenger cars" Journal of the Japan Institute of Marine Engineering, 2008, vol. 43, No. 2, pp. 62-69, cited in ISR, w/English translation (17 pages).

(Continued)

*Primary Examiner* — Joseph J Dallo
(74) *Attorney, Agent, or Firm* — WHDA, LLP

(57) ABSTRACT

In a droplet ejector equipped with an ejection port for ejecting minute droplets of a liquid, the ejection port 61 or the ejector and a conductor 10 such as a vehicle body are made electrically conductive to increase the electrostatic capacity of the ejection port 61 or the ejector and to suppress enlargement of the potential difference between the ejection port 61 and the liquid caused by flow electrification of the liquid. When the potential difference is large, a coulomb force acts between the electrified droplets and the electrostatically-charged ejection port, causing problems such as delayed or insufficient droplet discharge, but such problems are solved by increasing the electrostatic capacity of the ejection port 61 or the ejector.

5 Claims, 63 Drawing Sheets

(56) References Cited

U.S. PATENT DOCUMENTS 4,913,646 A * 4/1990 Backheim ................. F23C 9/00 239/399
2004/0040540 A1* 3/2004 Blakley .................. F02M 53/06 123/430
2005/0028787 A1* 2/2005 Abrams ................ F02D 19/084 123/445
2006/0128282 A1* 6/2006 Grechishkin ............. B24C 5/00 451/75
2010/0302322 A1* 12/2010 Wang ..................... B41J 2/1632 347/68
2014/0000235 A1* 1/2014 Kamen ..................... F28F 1/42 60/39.6
2014/0182282 A1* 7/2014 Kamen ................... F28D 7/024 60/517
2015/0040751 A1* 2/2015 Langenfeld ............... F28D 7/06 92/168
2015/0152809 A1* 6/2015 Langenfeld ............. F28F 27/00 60/517
2015/0184614 A1* 7/2015 Langenfeld ............. F28F 27/00 60/517
2017/0016615 A1* 1/2017 Morandi ................... F23C 9/08
2018/0058393 A1* 3/2018 Honda ................. F02M 61/145
2019/0309942 A1* 10/2019 Zink ...................... F23M 5/025

FOREIGN PATENT DOCUMENTS

CN 110080915 B * 1/2021 ......... F02D 41/0025
JP 5-133990 A 5/1993
JP 9-115873 A 5/1997
JP 2004-301099 A 10/2004
JP 2020110746 A * 7/2020 ............. F02M 27/04

OTHER PUBLICATIONS

International Search Report dated Mar. 17, 2020, issued in counterpart International Application No. PCT/JP2019/051205 (3 pages).

* cited by examiner (a)

FIG. 27

| | | INTAKE STROKE START TIME [ms] | TIME FROM EJECTION START TO END OF ARRIVAL [ms] | SOUND DELAY CORRECTION [ms] | EJECTION-ARRIVAL TIME [ms] | INTAKE STROKE TIME [ms] |
|---|---|---|---|---|---|---|
| HONDA MEN 450 | EJECTION (INSULATION) | 28.7 | 0.3 | 1.3 | 0.8 | 17.5 |
| | ARRIVAL | 125.1 | 1.8 | 2.8 | 0.6 | 15.8 |
| | EJECTION (CONDUCTION) | 348.8 | -0.1 | 0.9 | 0.5 | 14.1 |
| KTM 390 DUKE | EJECTION (INSULATION) | 72.1 | 0.20 | 1.2 | | 20.0 |
| | EJECTION (CONDUCTION) | 89.0 | -0.44 | 0.56 | | 20.0 |

FIG. 28

| | INSULAT CONDITION | CONDUCTING CONDITION | RATE OF INCREASE (%) |
|---|---|---|---|
| OUTPUT [hp] | 6.08 | 8.84 | 45% |
| TORQUE [kgfm] | 0.72 | 1.05 | 46% |

(a)

(a)

(c)

(d)

DROPLET EJECTOR

TECHNICAL FIELD

The present invention relates to a device for ejecting a liquid in form of micro-droplets for use in internal combustion engines (engine), ink jet printers, etc.

BACKGROUND ART

An ejector, which ejects a liquid as minute droplets to a target object, is one of essential techniques to improve the thermal efficiency of the engine by optimizing fuel combustion. When the liquid flows through an injector or a carburetor, flow electrification appears where the injector or the carburetor and the liquid becomes charged positively and negatively, respectively, and vice versa depending on the combination of the used materials so that the Coulomb attraction acts on the droplets and the ejector or the like. The major reason why the pressure for ejecting liquid increases as decreasing of the diameter of the droplet is explained as this Coulomb attraction originated from flow electrification. The techniques of the present invention are applicable to the surface finishing of coating or an ink jet printer for increasing dot density. Concerning internal combustion engines, the present invention brings the techniques to surmount the deterioration of combustion ratio resulted from the delay of fuel ejection or vaporization of the fuel droplet by Coulomb attraction, whereby not only high heat efficiency, high power and large torque are actualized but also decrease of un-burned hydrocarbon in exhaust gas are achieved.

The present invention is related to the techniques of surface modification of coating, fabrication of ultra-thin film multi-layer three-dimensional structure of semiconductor devices and generation of micro-droplets for high thermal efficiency of engines by optimizing the combustion of fuel. Generation of micro-droplets by ejection of liquid from an ejection port through a minute orifice with a diameter of sub-millimeter requires enormous pressure. Since specific surface area (surface area per unit volume or mass) increases in inverse proportion to the diameter of the orifice, the effect of flow electrification generated at the interface between the solid and the liquid becomes significantly large in the ejection of minute droplets. For the ejection of liquid against Coulomb attraction acting between the charge involved in the liquid or liquid molecules dielectrically polarized and the charged ejector or the ejection port resulted from flow electrification, the liquid requires an application of a great large pressure. As a result of using the techniques of the present invention to control the charged liquid and the micro-droplets electrically, the micro-droplets can be ejected with a small pressure as compared with the conventional methods. The techniques of the present invention are applicable to the surface modification of coatings or an ink-jet printer used for the densification of ultra-thin film multi-layer three-dimensional structure of semiconductor devices. In application to internal combustion engines, the present invention can bring not only high heat efficiency, high power and large torque but also reduction of un-burned hydrocarbon in exhaust gas, since the rate of combustion of fuel micro-droplet is very high.

Supposing ejecting time of a droplet with a diameter of 10 μm, for example, can be controlled accurately, a great innovation cluster in various fields will be yield. By applying micro-droplets, an improvement of thickness control and surface modification of coatings and upgrading of printing dot density and densification of information is expectable. In addition, the densification of organic semiconductor integrated circuits, ultra-thin film multi-layer circuit board and large area integrated circuits will be accelerated by a micro-droplet ink jet printer. Furthermore, the innovation of internal combustion engines is expectable. The internal combustion engines are one of the most important power sources for transportation facilities such as automobiles etc. and for other industrial fields, which form a highly advanced technical field. Thermal efficiency of the engines is 20%-30% for a gasoline engine and 30%-40% for a diesel engine, whose efficiency is lower than that of other heat engines, thus, the improvements are widely open. The adequacy of formation, induction and combustion of a fuel-air mixture, whereby thermal efficiency is decided, depends on the timing of induction, ignition, compression and exhaustion controlled mechanically and/or electrically. Time required for these processes is so short as several 100 μs to 10 ms, moreover, the conditions of temperature, pressure and a fuel-air mixture so forth change with the rotation rate. Therefore, physico-chemical phenomena in these processes are still open (see Non-patent Document 1).

Recently, the inventors found the periodical voltage spikes by the measurements of potential difference between an injector or an engine on operation and the ground (see FIGS. 31-36). FIG. 31 shows the potential difference of the injector installed in a motorcycle sold on market (HONDA MEN 450, Honda Motors Co. Ltd.) with a rotation rate of 6900 rpm. The injector was electrically insulated from a target object of the ejection of fuel, namely, an engine. Two arrows marked in FIG. 31 mean failures of injection. FIG. 32 is a magnification of the first impulse shown in FIG. 31. This indicates that the impulse comprises plural rises of potential and pulse vibrations. FIG. 33, a further magnification of FIG. 32, demonstrates that the potential rises with a maximum of about 3 V before the pulse vibrations. FIG. 34 shows the potential difference of the engine installed in the conventional motorcycle shown in FIG. 31 with a rotation rate of 7300 rpm. This engine was electrically insulated from the injector. As shown in the figure, periodical impulses can be seen adding to voltage fluctuation resulted from a power source. FIG. 35 is a magnification of the first impulse shown in FIG. 34. This indicates that the impulse comprises plural potential descents and pulse vibrations. FIG. 36, a further magnification of FIG. 35, demonstrates that the potential descents with a maximum of about 0.6 V before the pulse vibrations.

These potential changes are resulted from flow electrification where negative charges, namely, electrons are transferred from the wall of the ejector to the fuel. Generally speaking, flow electrification is a kind of frictional phenomenon. This phenomenon, where static electricity is generated by rubbing two dielectric materials of different kinds each other and one of them becomes negatively charged and the other positively charged, is well known from ancient Greek era. A pair of different kinds of materials to be charged are not limited to the dielectric ones but also a conductor and fluid. The magnitude of friction force is proportional to the load on the materials. Furthermore, the magnitude of friction force does not depend on an apparent macroscopic contact area between solids but is proportional to an actual microscopic contact area, namely, area of molecule level. Since an apparent contact area and an actual contact one are to be almost equal for the interface between a liquid and a solid, the amount of the electric charge per unit volume of the fluid originated from flow electrification increases with the contact area of the fluid.

Flow electrification has been known from early time (see Non-patent Document 2), for examples, explosion accidents in oil transportation tubes and oil tanks due to electric discharge by high electric field resulted from accumulation of electric charges were reported. Therefore, many studies have been performed on flow electrification (T. Paillat, G. Touchard and Y. Bertrand, Sensor, 2012, 12, 14315-14326). However, physical and chemical mechanisms and modes giving rise to flow electrification have not been elucidated yet, quantitative investigations are still expected.

The polarity of electric charges in a charged liquid is determined by the combination of materials of the system. Although it is described hereafter that the droplets is negatively charged for the convenience of understanding, this does not mean to exclude the case of positively charged.

PRIOR ART

Non-Patent Documents

Non-patent Document 1: Advanced engine technology, Heintz Heisler, 2009, Butterworth-Heinemann Non-patent Document 2: Electrostatics in Petroleum Industry: The Prevention of Explosion Hazards; A. Klinkerberg and J. L. van der Minne, 1958, Elsevier, Amsterdam, The Netherlands,

SUMMARY OF THE INVENTION

Problems to be Solved by the Invention

As mentioned above, thermal efficiency of internal combustion engines is low as compared to that of other heat engines, whereby it has enough room to be improved. The inventors elucidated flow electrification is a phenomenon where some troubles such as the delay or the failure of the ejection of the droplets sometimes occurs on ejecting liquid from an ejector with passing through the ejector, whose one of causes is flow electrification, whereby Coulomb force acts on the charged droplets and a charged ejection port so that the delay or the failure occurs.

The present invention achieved on these ground will bring a high efficiency droplet ejector by controlling the effects of flow electrification.

In an internal combustion engine using a minute droplet ejector, Coulomb attraction acts on the fuel liquid and the ejector port charged in the opposite polarity due to flow electrification, whereby the delay of ejecting fuel droplets occurs and a part of fuel is not taken into a cylinder. Furthermore, the results of the measurements of engine sound and the measurement of potential difference performed by the inventor demonstrate that the improvement of the efficiency of the vaporization of fuel droplets in the cylinder is important for actualization of a large combustion ratio of the fuel and a large output of power.

Based on these findings, the inventors developed a fuel ejector, an example of a fluid ejector above mentioned, which controls Coulomb force acting on a fuel liquid and fuel droplets ejected from a carburetor or an indirect ejection type fuel ejector or a direct ejection type fuel ejector, moreover developed a fuel ejector which efficiently emits micro-droplets so as to easily vaporize and controls the amount of the ejected fuel in response to the rotation rate of the engine.

The method to eject droplets intermittently from an ejection port by applying pressure to the liquid is practically very important for its simplicity and easiness to control. As decreasing of a diameter of an ejection orifice in order to eject the droplets with a small diameter, the applied pressure becomes large, since the drag of friction (fluid friction) augments due to the increment of the contact area of the liquid in inverse proportion to the diameter of the ejection orifice. Moreover, drag by the Coulomb attraction resulted from flow electrification is added, ejecting minute droplets less than sub millimeter becomes difficult.

In the present invention, with focusing on the fact that the liquid transferred by a pressure applied by a refueling pump has charges resulted from flow electrification, the electrostatic capacity of the fuel ejector is increased for the repression of the potential of the ejection port, whereby the increment of Coulomb force acting on the charged droplets is repressed. In addition, in order to eject micro-droplets efficiently, the charged liquid is accelerated and fragmented by electric field formed by an electrode or electrodes placed in front of the ejector port. Moreover, in order to eject micro-droplets efficiently, the charged liquid is vibrated by Coulomb force resulted from the voltage applied to an electrode or electrodes placed in the ejector or at the tip of the ejection port.

Due to the use of these techniques, micro-droplets with a diameter of 50 μm or less will be ejected by small pressure as compared to the conventional methods.

In addition, the promotion of heat transfer due to the increment of the collision probability between fuel droplets and the wall of the combustion chamber (cylinder or housing and so on) by Coulomb attraction resulted from applying voltage to the combustion chamber increases the ratio of vaporization of the fuel droplets. Further, time required for vaporization is shortened by the reduction of the diameter of the fuel droplets to about 50 μm.

By these techniques, the ratio of combustion of the fuel is increased and the engines with a large output and torque is actualized. Achievement of the high combustion ratio, which brings the reduction of un-burned hydrocarbon in exhaust gas, will contribute to the prevention of air pollution and the exhaustion of greenhouse gas.

Electrical double layer on the surface of the wall of a tube formed by spilling out of electrons where dielectric polarized liquid molecules or ions adsorb results in Stern layer and Guy-Chapman layer where the liquid flows suffering friction (viscosity). Apparent surface area can be considered to be actual surface area for liquid in contrast to solid. The ratio of liquid molecules in these layers to the total liquid molecules is in inverse proportion to the tube diameter and becomes large as decreasing of the diameter of the tube. Consequently, it requires large pressure to flow the liquid through a tube with a small diameter. Charges sometimes transfer from the solid to the flowing liquid over the interface, which is called flow electrification. The charges transferred to the liquid are gradually involved into the liquid with partially electrostatically shielded by dielectric polarization of the liquid molecules. In general, flow electrification is assumed to be friction, therefore, as increasing of friction force due to the increment of pressure normal to the wall, the amount of the charges transferred over the interface augments. Since the amount of charge per unit volume in the flowing liquid becomes large as decreasing of the diameter of the tube, Coulomb attraction acting on the wall and the charges in the liquid cannot be a negligible drag for the flow. For the ejection of micro-droplets controlled by time, which is crucially important in practical use, significantly large pressure is required, so that the wall of the tube must be sufficiently thick. Consequently, the path length of the micro-orifice of the ejector becomes long. Therefore, by conventional method applying pressure to a liquid using a pump, as decreasing of the diameter of the orifice, it becomes more difficult to eject minute droplets. Even if minute droplets may be ejected, it needs large-sized and heavy systems so that the fabrication cost becomes large. Further, with the system becoming large, secondary problems such as mechanical vibration and noises of the systems must be solved.

The present invention solves the following problems in order to generate micro-droplets simply with a small pressure by a refueling pump:

(1) To reduce Coulomb attraction acting on the charges in the liquid and the wall of the ejector resulted from flow electrification.

(2) To accelerate the charged liquid by applying voltage to an electrode for ejecting micro-droplets with a small pressure, and (3) To actualize large output, torque and high thermal efficiency of a power engine by fabricating a fuel ejector and a combustion chamber with taking the effects of flow electrification into consideration.

The inventors found that flow electrification causes various problems in feeding of fuel and the combustion of the fuel of internal combustion engines. Here, the factors determining thermal efficiency of heat engines are explained and the problems to be solved are made clear. In order to actualize ideal engines of high thermal efficiency, it should be addressed that "1. To put all ejected fuel into a cylinder" from a fuel carburetor, an indirect ejection type fuel ejector or a direct ejection type fuel ejector, and "2. To generate a fuel-air mixture with the optimal ratio of fuel to air", and then "3. To burn fuel molecules in the fuel-air mixture completely at optimal timing". It is to be noted herein that to burn at the optimum timing means the combustion in a restricted range of crank angle centered by 90°. This is obvious, since the forces at the top dead center and the bottom dead center of a piston do not work.

1. To Put All Ejected Fuel into a Cylinder

In a fuel carburetor, an indirect ejection type fuel ejector or direct ejection type fuel ejector, all fuel droplets ejected is required to be put into a cylinder at induction process, namely, within an interval of the intake valve open. Control of the ejection of fuel droplets is made by a velocity of flow (velocity of air) in intake tube for the carburetor, and by a refueling pump for an indirect ejection type fuel ejector. However, if Coulomb attraction acts between the fuel liquid and the ejector, which are charged in the opposite polarity due to flow electrification, part of fuel droplets are sometimes delayed in ejection by adsorbing to the ejection port (see FIG. 30), and result in being left in the intake tube instead of put into the cylinder (see FIG. 37 and FIG. 38). FIG. 37 shows droplets ejected in the insulated condition, where (X axis) is starting time of a pulse vibration comprised of 28 times of fuel ejections in FIG. 31 (the origin is the first pulse vibration), (Y axis) is the order of ejections and (Z axis) is the magnitude of vibrations V. FIG. 38 shows the droplets reached the cylinder in the insulated condition, where (X axis) is the starting time of pulse vibrations comprises the 28 times of fuel ejections in FIG. 34 (the origin is the first pulse vibration), (Y axis) is the order of arrivals and (Z axis) is the magnitude of vibrations V. Most part of the fuel left in the intake tube is exhausted to the exhaust tube passing through the cylinder while the intake valve and the exhaust one are simultaneously open from the final stage of the exhaustion process to the beginning stage of induction process (the range of about 30° in crank angle, respectively), which is assumed to burn there at the compression process (see the compression process in FIG. 41B, the combustion process in FIG. 41C, the compression process in FIG. 19B and the combustion process in FIG. 19C). The direct ejection type fuel ejector is free from such problem.

2. To generate Fuel-Air Mixture with the Optimal Ratio of Fuel to Air

The theoretical ratio of fuel to air is stoichiometrically estimated. However, since time is not considered as a factor in stoichiometry, the practical ratio of fuel to air fixed empirically with taking output and fuel efficiency into consideration has a wide range of values including the theoretical ratio of fuel to air. Sometimes, the fuel ejector does not operate properly depending on the rotation rate of engine (see the points marked by an arrow in FIG. 31), further, the ratio of fuel put into the cylinder and the ratio of fuel burning in a cylinder change. For the reliability of engines and the optimized operation, stable feeding of the fuel and generating the optimal fuel-air mixture are essential.

3. to Burn Fuel Molecules Completely at Optimal Timing

As mentioned above, in order to actualize high thermal efficiency, fuel should be burned completely in a limited range centered at 90° of the crank angle. The results of the measurements described later demonstrate that the combustion ratio in the combustion process becomes high as increasing of the interval where fuel droplets is staying in a cylinder by early injections, and moreover, as increasing of the efficiency of heat transfer from the surroundings to the fuel droplets. This means that the vaporization of fuel droplets requires longer time than that thought to be. The results of the measurements demonstrate that burning occurs also in the compression process and the exhaustion process. (See the compression process in FIG. 19B, the exhaustion process in FIG. 19D, the compression process in FIG. 43B and the exhaustion process in FIG. 43D). Combustion in the exhaustion process, which means braking the rise of a piston, is one of causes to deteriorate thermal efficiency of the internal combustion engines.

The present invention solves these problems by micronization of fuel droplets and facilitation of evaporation of the fuel droplets injected into a cylinder.

Means to Solve the Problems (1) One embodiment of the droplet ejector of the present invention is a droplet ejector having an ejection port to eject droplets of a liquid fuel for an internal combustion engine, wherein: the ejection port has one or more ejection orifice for ejecting droplets, the ejection port or the droplet ejector is electrically connected to a combustion chamber directly for suppressing potential increase due to flow electrification of the droplets, and electrostatic capacity of the ejection port or the droplet ejector is made larger than un-conducted condition with the combustion chamber.

(2) One embodiment of the droplet ejector of the present invention is the droplet ejector of the above (1), wherein an electrode is further disposed in front of the ejection port, and the droplets ejected from the ejection port are accelerated by electric field formed by applying voltage to the electrode.

(3) One embodiment of the droplet ejector of the present invention is the droplet ejector of the above (1), wherein the ejection port has one or more electrode therein for controlling the ejection of liquid fuel, and the potential of the electrode is altered for controlling the ejecting timing and the amount of the ejected liquid fuel pressurized to be ejected from the ejection port.

(4) One embodiment of the droplet ejector of the present invention is the droplet ejector of the above (1), wherein positive voltage is applied to the combustion chamber for increasing collision probability between the droplets negatively charged by flow electrification and the combustion chamber.

(5) One embodiment of the droplet ejector of the present invention is the droplet ejector of the above (1), wherein a system for ejecting the droplets from the ejection port comprises a pressure chamber in communication with the ejection port, a vibration plate for changing volume of the pressure chamber, an actuator for driving the oscillation of the vibration plate, a controller for regulating the driving of the actuator and a sensor for conveying information about a vehicle to the controller, and the controller regulates the actuator based on the information from the sensor for oscillating the vibration plate so that the droplets of the liquid fuel accommodated in the pressure chamber are ejected from the ejection port having ejection orifices of 50 μm or less in diameter so as to make the diameter of the droplets to be 50 μm or less.

Advantages of the Invention

The droplet ejector of the above (1) can provide highly efficient micro-droplet ejection by controlling the effect of flow electrification. The droplet ejector can suppress potential increase of the droplet ejector and potential descent of the internal combustion engine by electrically connecting the ejection port or the droplet ejector with the combustion chamber.

The droplet ejector of the above (2) can efficiently eject micro-droplets from the ejection port sans delay by acceleration of the electric field.

The droplet ejector of the above (3) can control the amount of the ejected liquid by adjusting the ejecting timing by providing the ejection port inside with one or more electrode and changing the potential thereof for vibrating the electrons in the pressurized liquid. The amount of ejected liquid can control by changing Coulomb force acting between the charged liquid and the electrode whereby the ejection timing is adjusted with the potential.

The droplet ejector of the above (4) can increase collision probability with a target object by making Coulomb force act on the charged micro-droplets.

The droplet ejector of the above (5) can easily eject micro-droplets of 50 μm or less in diameter from the plural ejection orifices of 50 μm or less in diameter.

BRIEF DESCRIPTION OF DRAWINGS

FIG. 27 is a diagram for explaining the embodiment 4 with the starting time of induction process as the origin.

FIG. 28 is a diagram indicating the results of motive power measurement.

Forms for embodiments of the invention:

Hereinafter, the present invention are described by referring to some embodiments.

EMBODIMENT 1

In this embodiment, a carburetor or an indirect ejection type fuel ejector and a direct ejection type fuel ejector installed to an automobile is explained by referring to FIG. 1-FIG. 3 and FIG. 15-FIG. 17.

This fuel ejector is one which reduces a rise of electric potential resulted from flow electrification by increasing the electrostatic capacity of an ejection port.

Also, this fuel ejector represses the rise of own electric potential and the descent of a target object by electrically connecting the ejection port to the target object.

In the case of generating micro-droplets by ejecting pressurized liquid from a micro-orifice at the ejection port, the charged liquid due to flow electrification is affected a drag in the opposite direction to the liquid flow. Therefore, the ejection of micro-droplets requires the application of large pressure. Also, the droplets adsorbs to the ejection port due to Coulomb attraction, whereby the delay of the ejection of the droplet occurs. In order to reduce this effect, the rise of electric potential is repressed by increasing the electrostatic capacity of the ejector or the ejection port. Assuming that the amount of charge Q resulted from flow electrification per ejection of a droplet is constant, the product of electrostatic capacity C and potential V becomes constant (Equation 1).

(Equation 1)

$$Q=CV \tag{1}$$

In order to increase electrostatic capacity, the ejector or the ejection port is connected to a conductor with a large surface area (electrostatic capacity Co), then the resultant electrostatic capacity becomes C' (=Co+C>C). C' is related to the potential V' (in the electrically connected condition) as represented by (Equation 1), whereby (Equation 2) and (Equation 3) are obtained.

(Equation 2)

$$Q=C'V'=CV \tag{2}$$

(Equation 3)

$$V'=\frac{C}{C'}V>V \tag{3}$$

Therefore, the rise of the potential can be repressed by connecting the ejector or the ejection port to the conductor with large electrostatic capacity.

In order to increase electrostatic capacity Co of the micro-droplet ejector or the ejection port 61, it is connected to the conductor 30 with a large surface area (electrostatic capacity C'). Then the resultant electrostatic capacity C becomes C=Co+C'>C'. By way of examples of a conductor with a large surface area, a body (frame, chassis) 10 of automobiles is mentioned (see FIG. 1). In addition, it is also effective to connect electrically with the coatings of the car body of electrically conductive materials or electrically conductive plastic parts and so on.

Figure 1:
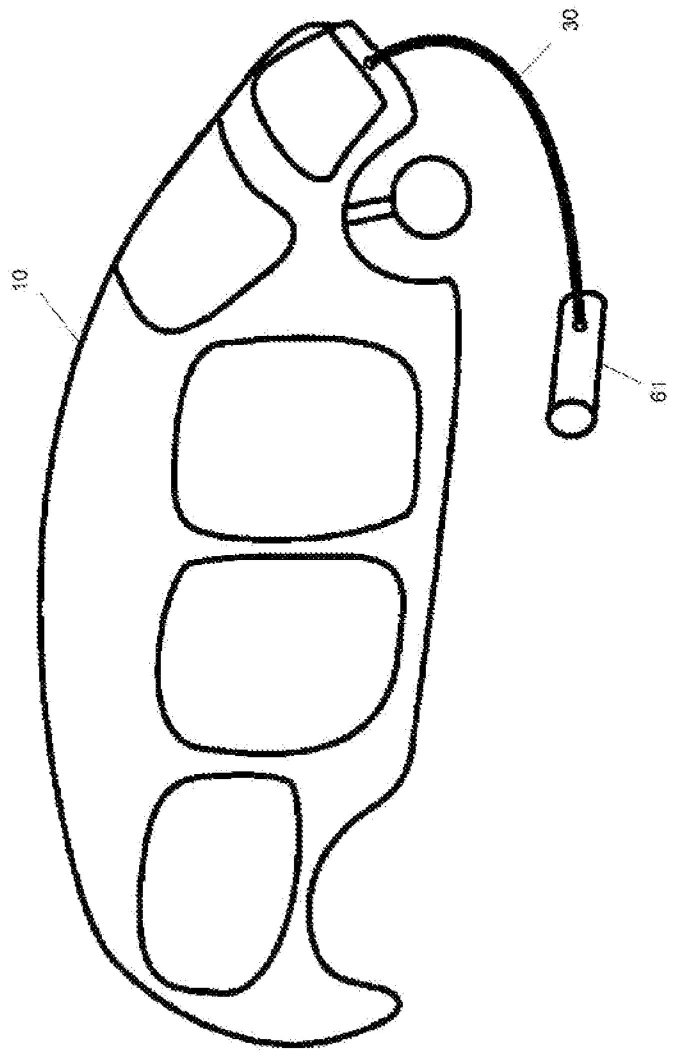
FIG. 1 is a diagram of an automobile and an ejection port of a fuel ejector for explaining the embodiment 1.
Figure 2:
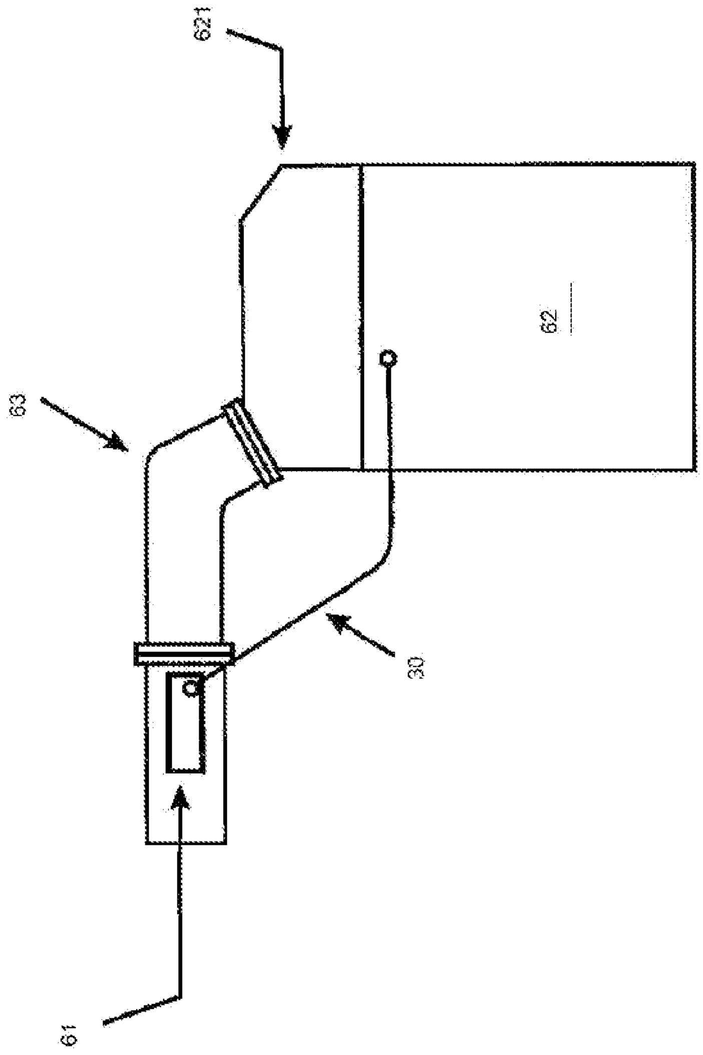
FIG. 2 is a diagram of a cylinder and an ejection port of an internal combustion engine for explaining the embodiment 1.
Figure 3:
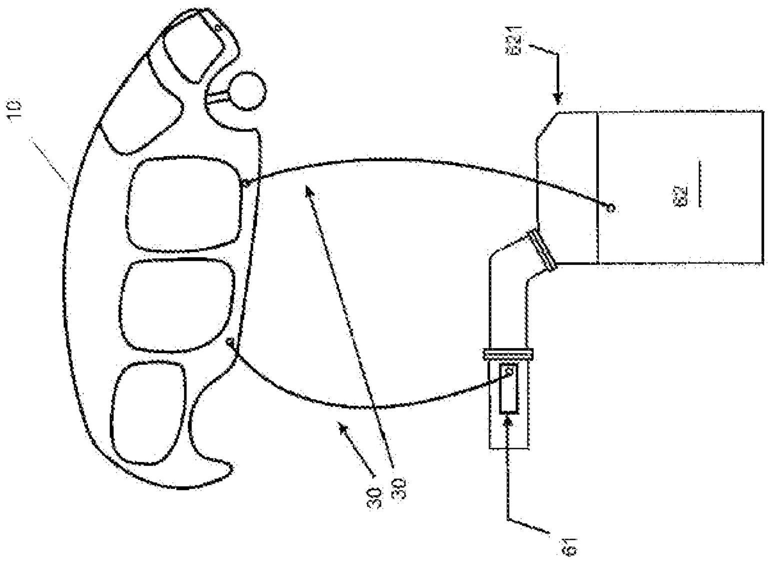
FIG. 3 is a diagram of an automobile, an internal combustion engine and an ejection port for explaining the embodiment 1.
Figure 15:
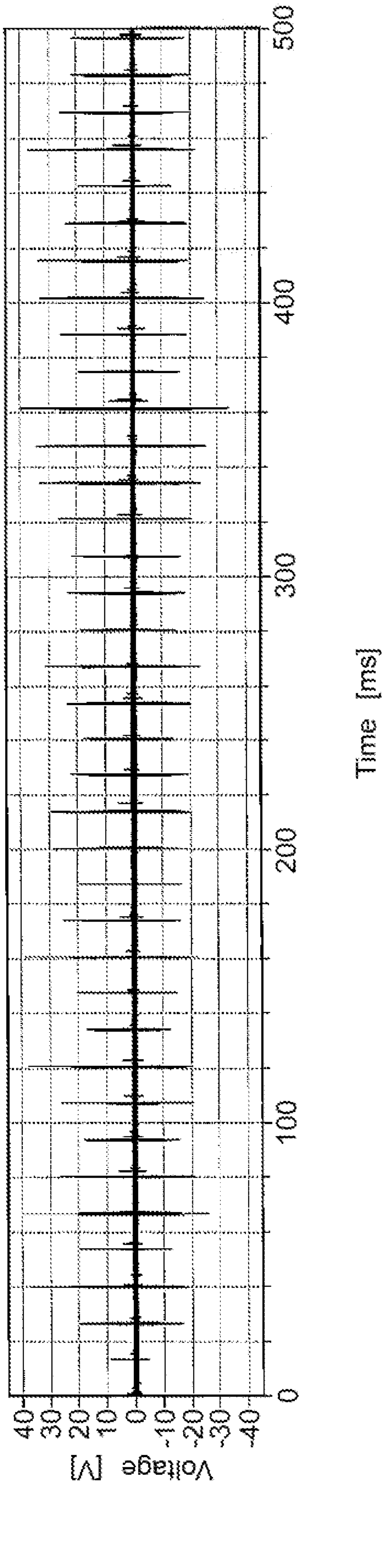
FIG. 15 is a diagram of the feature of potential changes in the electrically connected condition for explaining the embodiment 1.
Figure 16:
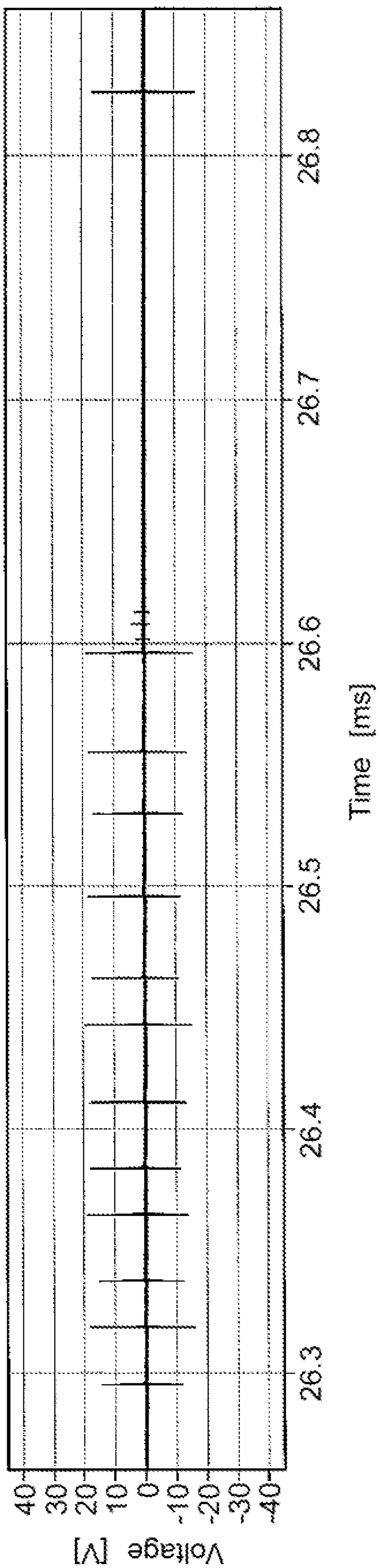
FIG. 16 is a magnification of the first impulse in FIG. 15.
Figure 17:
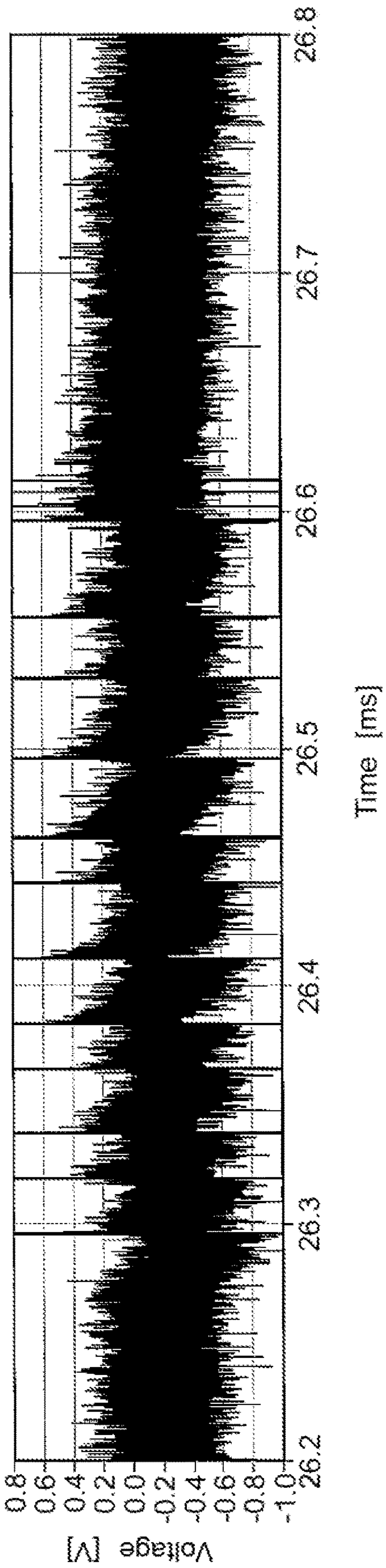
FIG. 17 is a magnification of FIG. 16 magnified further.

In order to repress the rise of the potential of a fuel carburetor or an ejector of the internal combustion engine or the descent of the potential of an engine, the fuel ejector (or its ejection port 61) and the engine (cylinder 62 or the like) are electrically connected (see FIGS. 2 and 3). The measurements of electric potential demonstrate obviously that the fluctuation of the potential is repressed by this technique (see FIGS. 15-17). FIG. 15 shows the results of the measurements of potential for the fuel ejector connected to the engine installed at the motorcycle used in the measurements thereof results shown in FIG. 31. The rotation rate of the engine was 8000 rpm. FIG. 16 is a magnification of the first impulse in FIG. 15. Periodic impulses can be seen but potential changes prior to the impulse is hardly seen. FIG. 17 is a magnification of FIG. 16. A small decent of voltage (about −0.2 to −0.3V) is seen prior to the pulse vibration.

EMBODIMENT 2

In the embodiment 2, a fuel ejector is explained in referring to FIG. 4. This fuel ejector is characterized by that, wherein an electrode 64 is placed in front of the ejector 61 whereon positive voltage is applied, whereby the negatively charged liquid is accelerated by the electric field so that droplets are ejected from the ejection port.

Figure 4A:
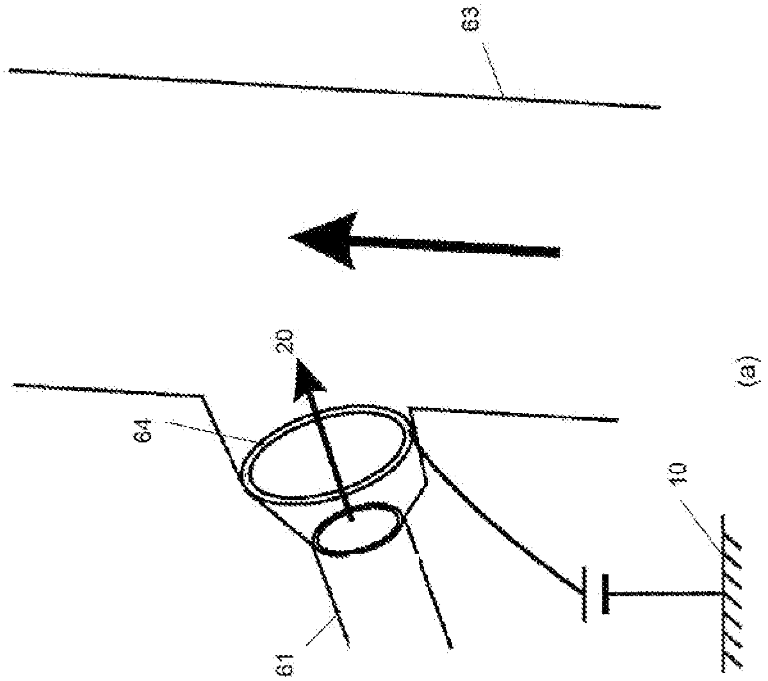
FIG. 4A is a diagram of an ejection port and a confronting electrode for explaining the embodiment 2.
Figure 4B:
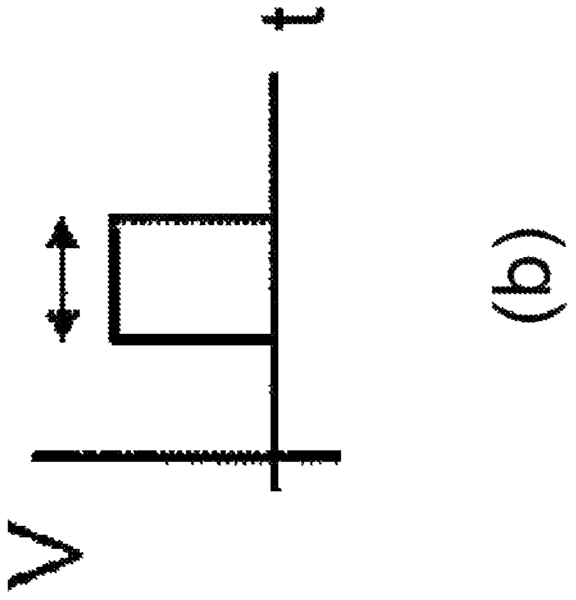
FIG. 4B is a diagram of changes of electrode voltage in the induction process in the embodiment 2.

The electrode 64 is placed in front of the ejection port 61 of the micro-droplet ejector along the course of ejection and positive voltage is applied to the electrode 64 for accelerating the negatively charged micro-droplets in the direction of their movement (see FIG. 4A, wherein an indirect ejection type fuel ejector is used for an internal combustion engine). When the force by the electric field and the pressure applied by the refueling pump becomes larger than the Coulomb attraction acting between the negatively charged liquid and the ejection port 61, the tip part of the liquid is disrupted and ejected as a droplet. Since the balance of forces act on the negatively charged liquid collapses by even a small pressure by the refueling pump, micro-droplets can be ejected earlier than the case without electric field.

Since positive charges on the wall of the tube resulted from flow electrification are transferred attending with the negatively charged liquid near the ejection port, the density of the positive charges is assumed to be the highest at the ejection port. Therefore, the micro-droplets ejected outside from the ejection port 61 with a small initial velocity is adsorbed to the surface of the ejection port by Coulomb attraction.

Acceleration by the electrode 64 is able to reduce this adsorption. The downsizing of a refueling pump and the reduction of fabricating cost can be actualized by this method. In addition, the vibrations and noises generated by the operation in high pressure of the refueling pump and the ejector are also reduced. (Mitigation of noise and vibration in high-pressure fuel system of a gasoline direct injection engine, J. Borg, A. Watanabe and K. Tokou, Procedia 48 (2012) 3170-3178). By changing the magnitude and timing of applying the voltage to the electrode 64, ejecting timing of the micro-droplets is adjustable. This technique can be applied to wide areas requiring ejection of micro-droplets, for example, an ink jet or systems where power source is the energy generated by burning of ejected liquid fuel (a reciprocal engine, a rotary engine and so on).

By applying positive voltage to the electrode 64 placed in front of the ejection port, the negatively charged liquid is accelerated in the electric field, whereby micro-droplets are ejected. The shape of the electrode 64 is preferable to be ring or cylindrical with good symmetry so that ejected fuel droplets can pass through the empty part. The electrode 64 is placed at a proper position near the ejection port not to contact with the droplets and not to make the applied voltage too large (see FIG. 4). The magnitude of the voltage applied to the electrode 64 depends on the amount of charges in the liquid, the mass of a droplet and the distance between the ejection port and the electrode.

In the case of the experiments disclosed later in the description after the paragraph 0045, the potential rise of the injector was about 3V in the condition of the injector was insulated from the engine. Consequently, required voltage is assumed to be about 10V at most. In application to an internal combustion engine, it may apply constant voltage or apply pulse voltage on occasion of ejecting liquid fuel with synchronized to the operation of a refueling pump, with correspondence to clank angle, or with detecting the potential increase at an ejection port (see FIG. 4B).

EMBODIMENT 3

Figure 5:
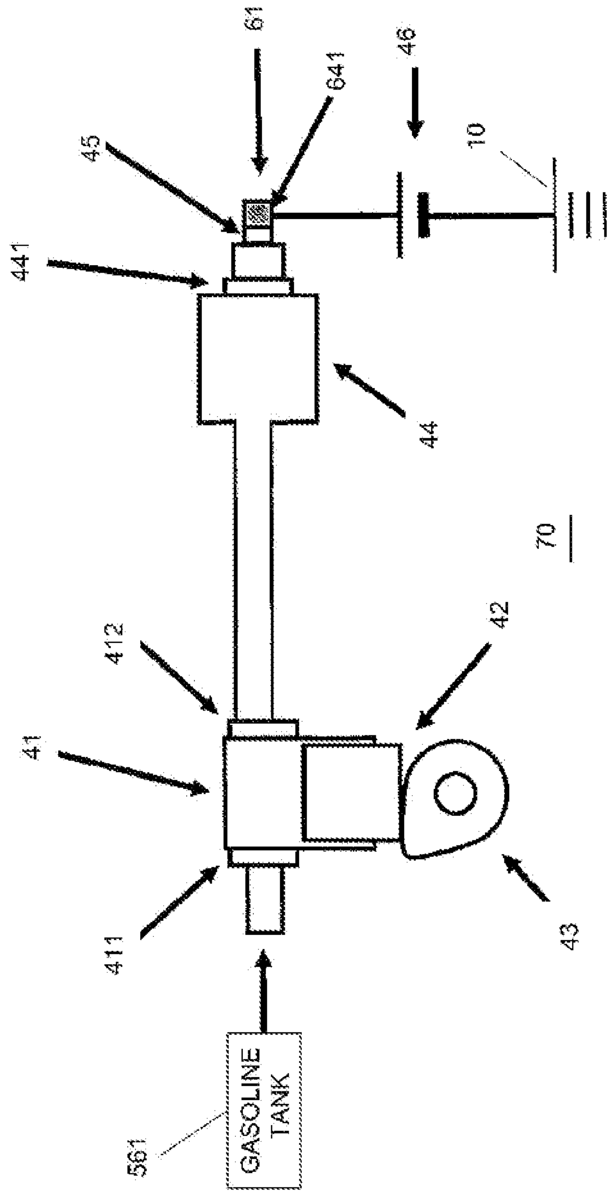
FIG. 5 is a diagram of an ejection port connected with a high pressure pump for explaining the embodiment 3.

In an embodiment 3, a fuel ejector is explained by referring to FIG. 5 and FIG. 29.

This fuel ejector is characterized by that, wherein one or more electrode placed inside of an ejection port whose potential is changed for vibrating electrons in the pressurized liquid, whereby the timing of the ejection is adjusted in order to control the amount of an ejection.

The fuel ejector concerning with this embodiment, being different from the ejector as disclosed in FIG. 4A, is equipped with an electrode 641 at the ejection port 61. And the electrode 641 is connected to one pole of a battery 46 whereof other pole is grounded.

The diameter of the flow path of the micro-droplet ejector is the smallest at the ejection port 61 and the number of the charges involved in the liquid resulted from flow electrification increases as increasing of flow length, so that the density of the charge in the liquid becomes the maximum near the outlet of the ejection port 61. The charged liquid is transferred attending with the positive charges on the wall, whereby the density of the positive charge on the wall of a tube becomes the maximum near the outlet of the ejection port 61. Therefore, the Coulomb attraction acting on the charged liquid per unit volume becomes the maximum near the outlet of the ejection port 61. Between the Coulomb attraction acting on the charged liquid and the pressure by the pump 41A, a balance of forces is momentarily established. At this moment, the potential on the ejection port 61 or the electrode 64 installed in the ejection port is reduced, then micro-droplets are ejected due to the collapse of the balance of forces by decrease of Coulomb attraction. By further decreasing of the potential, Coulomb repulsion begins to act, whereby the micro-droplets are assumed to be ejected by even a small pressure by the refueling pump 41 (see FIG. 5 where a diagram of application for a direct ejection type fuel ejector of an internal combustion engine is demonstrated).

Figure 6:
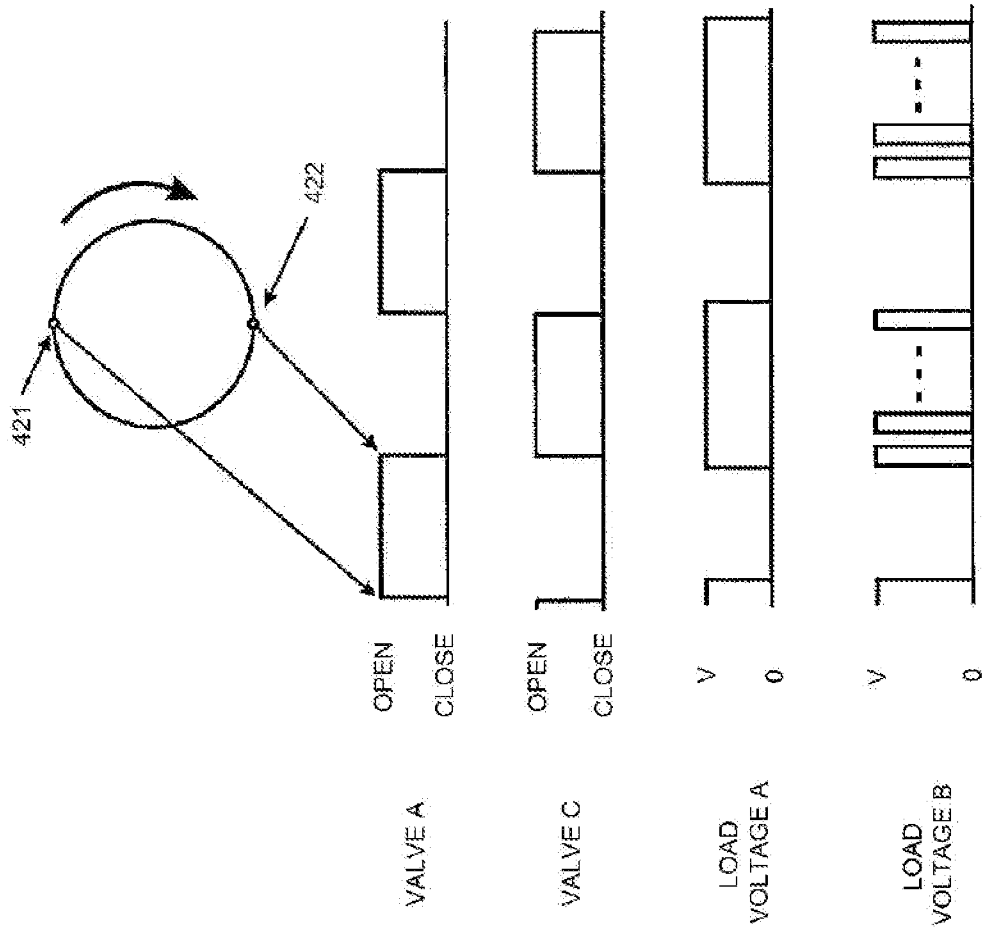
FIG. 6 is a diagram of the operation of an ejection port for explaining the embodiment 3.

Therefore, under the pressurized condition by a high pressure pump 41, a repetition of the rise and the descent of the electrode potential, whereby Coulomb attraction and Coulomb repulsion work alternatively to vibrate the liquid, is applicable to a "single-electrode electrical vibration chopper" wherein the liquid is disrupted and ejected intermittently as droplets. (see FIG. 6. wherein the behavior of the lifter 42 linked to the rotation of the cam 43 in FIG. 5 (421 indicates the top dead center of the lifter, 422 indicates the bottom dead center of the lifter), the correlation between open/close operation of the valve A411 of the high pressure pump 41 and the valve C441 of the reservoir 44 and the operation of the voltage A or the pulse-beating voltage B applied to the electrode 641 are demonstrated).

Figure 29A:
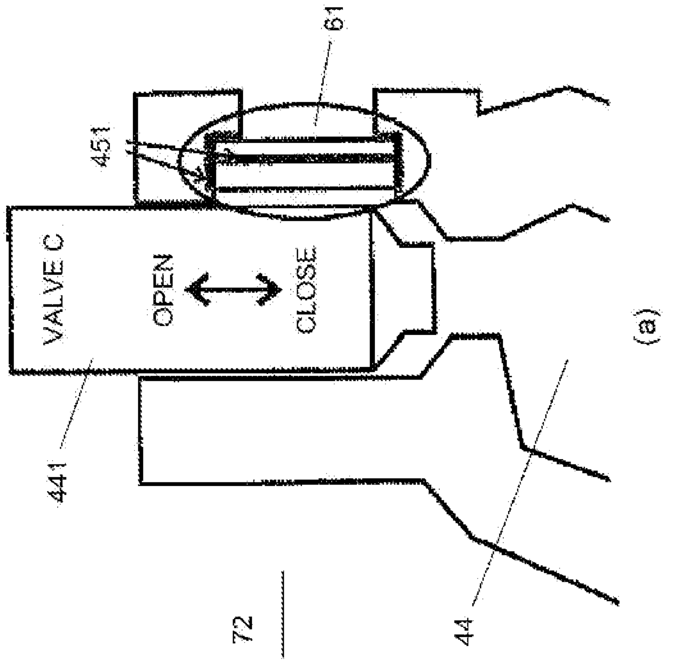
FIG. 29A is a diagram demonstrating the details of FIG. 5 (electrical vibration chopper).
Figure 29B:
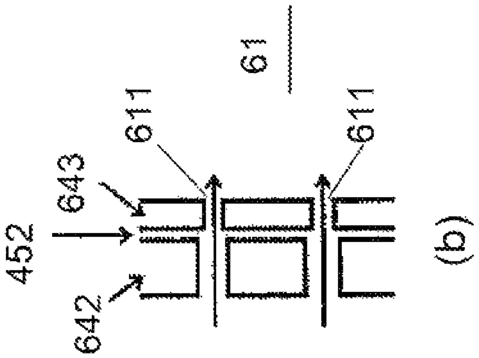
FIG. 29B is a diagram demonstrating the details of FIG. 5 (cross section of the ejection port).
Figure 29C:
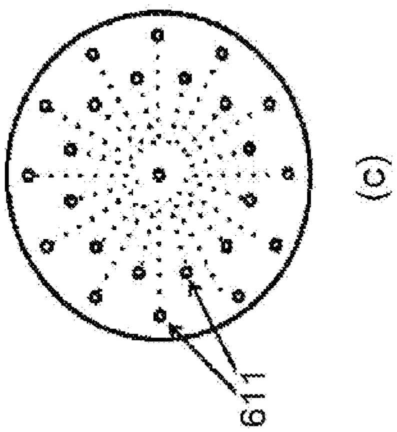
FIG. 29C is a diagram demonstrating the details of FIG. 5 (front view of the ejection port).
Figure 29D:
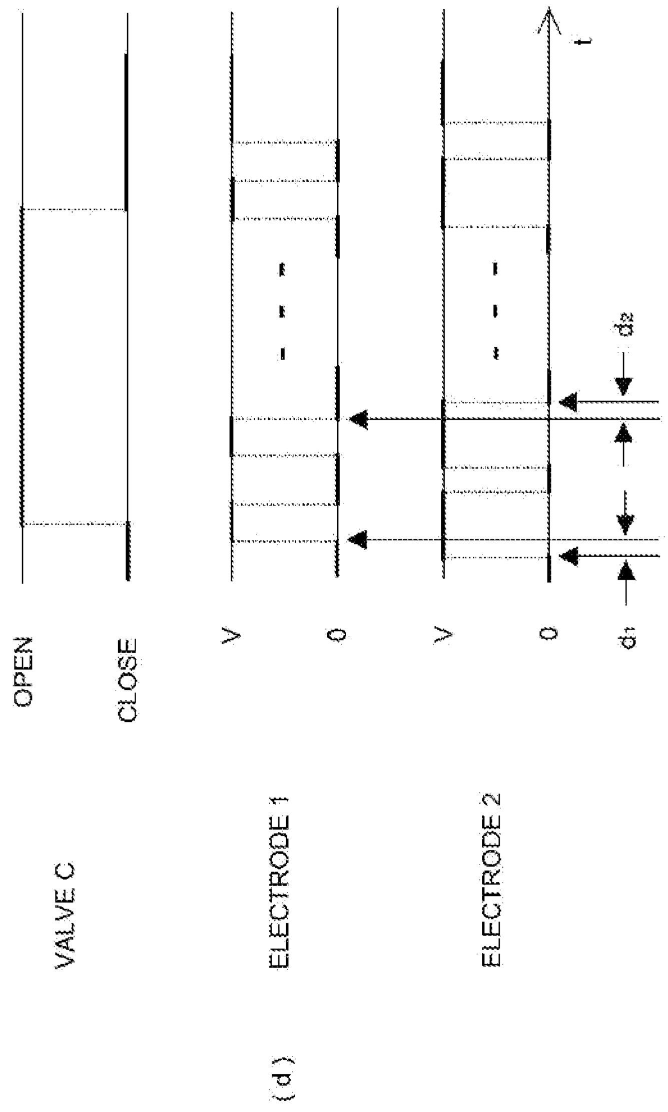
FIG. 29D is a diagram demonstrating the details of FIG. 5 (open or close state of valve C and electrode potential).
Figure 30A:
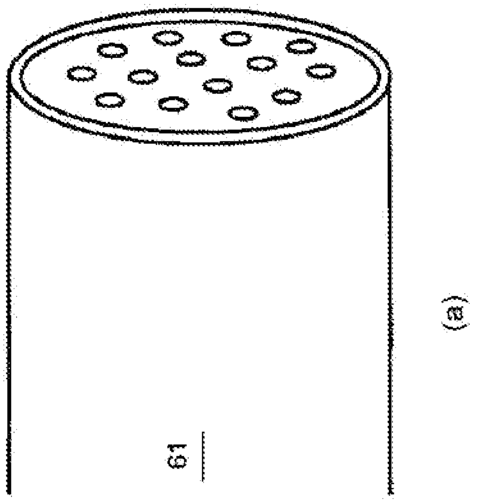
FIG. 30A is a diagram of the adsorbing state of fuel liquid to an ejection port in the conventional technique (in the insulated condition).
Figure 30B:
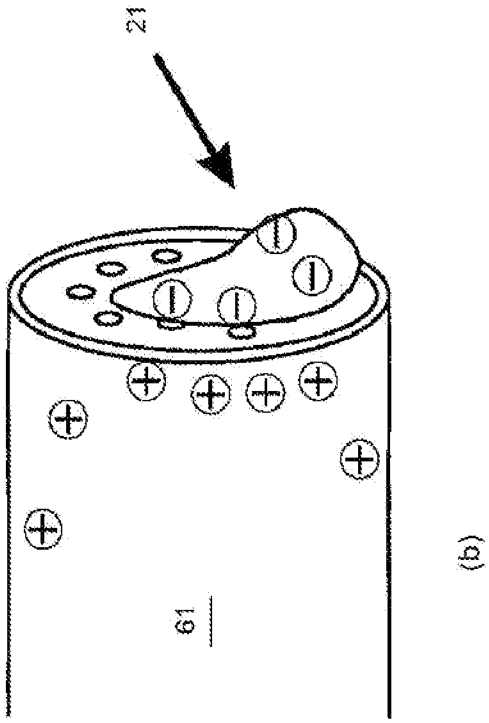
FIG. 30B is a diagram for demonstrating the state of the fuel liquid adsorbing to the ejection port.

The combination of plural electrodes, wherein the periods of vibration of the applied voltage is slightly shifted and the amplitude of vibration increased with the increment of the amount of liquid, is applicable to the "electrical vibration chopper" for the ejector of high ejection efficiency, which is usable to even an ejector with a long flow path. FIG. 29. shows an example for a direct ejection type fuel ejector for an internal combustion engine (FIG. 29A demonstrates the structure of the electrical vibration chopper 72, FIG. 29B shows the cross section of the ejection port 61, FIG. 29C shows the front view of the ejection port 61 and FIG. 29D indicates the correlation between open and close operation of the valve C441 and the potential of the electrode. The ejection port 61 is installed to the mounting hole of the reservoir 44 through the insulator 451. The ejection port 61 is opened when the valve C441 moves upward, while the ejection port 61 is closed when the valve C441 moves downward. The ejection port 61 is equipped with the electrode 1 (642) and the electrode 2 (643) intervened by an insulator 452 and a number of ejection orifices 611 going through the electrode 1, the insulator 452 and the electrode 2. FIG. 29D indicates the condition of the fluctuation period of the electrode 1 and the electrode 2 where both periods are slightly shifted each other.).

The "electrical vibration chopper" where charged electrons in the liquid are accelerated so as to be vibrated by plural electrodes is an apparatus whose structure resembles an electroendosmosis flow pump. Here, these apparatuses are compared each other and examined from basic principles to the situation of application so that the novelty and the originality of the present invention will become obvious.

The electroendosmosis was discovered by Reuss (F. F. Reuss, Notice sur un nouvel effete de l'électricité; galvanique, Memoires de la Société; Impériale; riale des Naturalistes de Moscou, 1809, 2: 327-337), which is a phenomenon where voltage applied to a pair of electrodes intervened by clay in water give rise to water flow.

So far, this phenomenon is explained that; When solution contacts the surface of a solid material, ions contained in the solution adsorbing to the atoms of the surface of the solid (substrate) form Stern layer, whereof outside Gouy-Chapman layer excessively containing the ions with the same polarity of the adsorbed ions is formed. Assuming that the ions are positive hereinafter. The adsorbed ions in Stern layer are fixed and immovable, while the ions in Gouy-Chapman layer move toward the electrode with the opposite polarity attending with solvent molecules under the application of electric field, and therefore, water flows (H-J. Butt, K. Graf and M. Kappl, "Physics and Chemistry of interfaces", $3^{rd}$ ed., 2013, Wiley-VCH, translated by Yasuhito Suzuki and Kouji Fukao from Maruzen).

According to this concept above mentioned, the stable flow velocity yin the infinitely small volume in Gouy-Chapman layer is derived from Navier Stokes equations (Equation 4) and equation of continuity (Equation 5):

(Equation 4)

$$-\eta\Delta v + gradP + \rho_e E = 0 \tag{4}$$

(Equation 5)

$$divv = 0 \tag{5}$$

Where, $\eta$ represents viscosity of the liquid, $\rho$ represents pressure applied to the liquid, $\rho_e$ represents charge density of the positive ions in the Guoy Chapman layer and E represents electric field generated by plate electrodes. The expression in the book (H-J. Butt, K. Graf and M. Kappl) is modified in order to make it obvious that the first term of Equation 4 means the drag resulted from viscosity, wherein the pressure p and the electric field E are parallel with the same direction to the X-axis and positive and negative polarities are exchanged. The velocity v of a flowing fluid is derived from the equations (4) and (5) applied the validity of the Poisson equation here.

(Equation 6)

$$\Delta\phi = -\frac{\rho_e}{\varepsilon\varepsilon_0} \tag{6}$$

However, not only the ions with the same polarity of the adsorbed ions but also the ions of the opposite polarity are contained in the liquid. An equation of motion including all ions movable in electric field, except the adsorbed and immovable ions, should be considered. Therefore, the Navier Stokes (equation 4) should be modified to (Equation 7):

(Equation 7)

$$\eta\Delta v - gradP + \rho_e E - \rho_e^c E = 0 \tag{7}$$

Here, $\rho_e$ represents the charge density of ions in the liquid and $\rho_e^c$ represents the charge density of opposite ions and each of them is a function of position. The direction of pressure P in (Equation 7) is opposite to that in (Equation 4) in order to make the same direction with the flow. The relation between $\rho_e$ and $\rho_e^c$ are expressed as the following. Here, $\rho_e^{ad}$ represents the density of the ions included in the liquid of the Stern layer. Since $\rho_e^{ad}$ is given by the following (Equation 8), the expression is modified to the following (Equation 9):

(Equation 8)

$$\rho_e^{ad} = \rho_e^c - \rho_e > 0 \tag{8}$$

(Equation 9)

$$\eta\Delta v - gradP - \rho_e^{ad} E = 0 \tag{9}$$

Since the pressure P is usually zero, the equation means that the driving force of the electroendosmosis flow, as a macroscopic flow, is the force that the charges of the opposite polarity to the adsorbed charges but equal in number receive in the electric field. The charges of ions and liquid molecules move together due to charge-dipole interaction, thereby macroscopic flow of the liquid is generated. For the existence of steady flow expressed by the following (Equation 10), wherein $n_{ad}$ represents the number of ions adsorbed to the substrate and N represents the number of adsorption cites on the surface of the substrate, the condition, n<<N, should be satisfied.

(Equation 10)

$$\rho_e^c = \rho_e + \rho_e^{ad} \tag{10}$$

The profile of the velocity of electricendosmosis flow according to (Equation 4) must show that the velocity becomes small near the interface and takes the minimum at the central axis of the channel where $\rho_e$ becomes the minimum. While (Equation 9) shows that the flow velocity takes the maximum at the position of the central axis, furthermore in the case of a sufficiently large diameter of tube, the flow velocity becomes nearly stable due to the constancy of the concentration of the ions except near the interface. The observation of the electricendosmosis flow through a capillary with particulates as a marker by an optical microscope shows the profile expected from (Equation 9). (H-J. Butt, K. Graf and M. Kappl, "Physics and Chemistry of Interfaces", $3^{rd}$ ed., 2013, Wiley-VCH, translated by Yasuhito Suzuki and Kouji Fukao from Maruzen).

The (Equation 9) is a general equation which is valid not only electroendosmosis flow velocity but also flow velocity in steady state under the application of electric field on the liquid containing charges. For example, macroscopic flow does not appear in an electrolytic bath wherein a electrolytic solution is applied electric field but pressure, since the ratio of adsorbed ion is extremely low, and thus $\rho_e^{ad}$ is assumed to be null. When electrons are involved in the liquid due to flow electrification, wherein $\rho_e^{ad}$ is considered as the density of electron in the liquid, the force acting on the electrons in electric field together with a pressure generates a stable flow.

However, there are the following differences between the acceleration of electrons involved in the liquid due to flow electrification by electric field and the acceleration of ions contained in a solution:

(1) Pressure Applied to the Liquid

Electrons can be involved in a liquid due to flow electrification under the condition where the liquid is pressurized heavily. However, in an electroendosmosis flow pump, ions are already contained in a solution, whereby the application of pressure is not required. Only a supplementary small pressure is required, if any (see JP2004-276224 A).

(2) Material of Flow Tube

For flow electrification, a metal tube is used in order to bear large pressure, while for an electroendosmosis flow pump, dielectric materials (silica glass, aggregate of oxide particulate and polymer such as polycarbonate PC and polymethyl-methacrylate PMMA and so on) are used for the adsorption of specific kind of ions.

(3) Kind of Liquid

Any kind of liquid will meet flow electrification. While for an electroendosmosis flow pump, polar solvents are assumed to be required to dissolve sufficient ions therein.

The electroendosmosis flow pump applying electroendosmosis is the device to transport very small quantity of solution wherein ion current flows by applying electric field, which is used in the field of chemical analysis, chemical synthesis or life sciences. The electric field formed either by a pair of electrodes placed outside and intervening a capillary tube, a flow path made on a substrate, a porous structural materials such as a dielectric porous aggregate etc. or by a pair of electrodes placed inside the capillary whereby the accelerated liquid is transported. Therefore, one of the electrodes is positive and the other is negative so that the magnitude and the direction of the obtained flow is constant.

While "an electrical vibration chopper" is the device to vibrate electrons with changing the potential of an electrode/electrodes whereby the pressurized liquid is ejected as droplets from the ejection port. The liquid is mostly transported by a high pressure pump. In "the electrical vibration chopper", the voltage of the electrodes are exchanged, then the two flows of electrons with opposite direction are instantly generated, furthermore, as exchanging of the voltage, the direction of the flow of the electrons are reversed. Consequently, the liquid vibrates parallel to the direction of the flow and if the amplitude of the vibration is sufficiently large, the liquid is disrupted and is ejected from the ejection port as droplets. "A single-electrode electric vibration chopper" can eject droplets, since even a single electrode can vibrate electrons. By using plural electrodes, the droplets can be ejected more efficiently due to the vibration of a large amount of liquid.

By using "the single-electrode electrical vibration chopper" or "the electrical vibration chopper" for fuel droplets ejector of internal combustion engines, the promotion of the efficiency of fuel combustion will be actualized owing to the micronization of the fuel droplets. The quantity of ejected fuel per unit time and ejection times are changed by adjustment of the magnitude and the period of potential changes, whereby the quantity of micro-droplets per unit time is simply controllable. A direct ejection type fuel ejector has an excellent property that all of the ejected fuel is put into a cylinder. However, it requires a high pressure to eject the fuel. By using "the single-electrode electrical vibration chopper" or "the electrical vibration chopper", the pressure through the high pressure pump will be reduced, whereby the downsizing and cost-cutting of the pump will be achieved. In addition, the reduction of vibration and noises attending with a high pressure operation will be actualized. (Mitigation of noise and vibration in high-pressure fuel system of a gasoline direct injection engine, J. Borg, A. Watanabe, K. Tokuo, Procedia 48 (2012) 3170-3178).

This method is applicable to wide fields requiring the ejection of micro-droplets, for example, an inkjet and systems in wide fields wherein power sources are the energies generated by burning of ejected liquid fuel (such as rotary engines, jet engines etc.).

The electrode 641 is installed in the ejection port 61 or a part of the ejection port of a micro-droplet ejector (see FIG. 5), the liquid is fed to the ejection port 61 in high potential condition. In the case of sucking up the liquid by a high pressure pump 41, the valve A411 is opened and the valves B412 and C441 are closed. In the case of transferring the liquid to the ejection port, the valve A411 is closed and the valves B412 and C441 are opened. On ejecting the liquid, the valve C441 may be closed. Taken the effect of flow electrification into consideration, the diameter of the flow path upper than the valve C441 is preferable to be large enough. FIG. 5 shows a syringe type pump 41, any type of pump will be used.

As an example for the application of "the electrical vibration chopper" to the fuel droplet ejector of an internal combustion engine, the example where a pair of electrodes are used is shown in FIG. 29. The electrode 1 (642) and the electrode 2 (643) require being thick enough to endure a large pressure. Supposing that the diameter of the flow path for the electrode 1, for example, is 100 μm and the diameter of the flow path for the electrode 2 is 50 μm (diameter of the ejection orifice), whereby the liquid is transferred to the electrode 2 (643) with a smaller pressure as compared to the both diameters being 50 μm. In this case, the electrode 1 (642) may be thick so as to increase mechanical strength. In application to a direct ejection fuel ejector, it is preferable to minimize the volume of the space to the electrode 1 formed by closing the valve C441. The potential of the electrode is changed repeatedly so that the fuel is intermittently ejected as droplets. An example for the opening and shutting of the valve C441 and the changes of the potential applied to the electrode 1 and the electrode 2 is shown in FIG. 29D. The time lags d1 and d2 with switching on or off in applying voltage to the electrode 1 and the electrode 2 are preferable to be adjusted depending on the flow path length. In the case of the application to an ejector for multi-cylinder engines, under the condition of the liquid in the reservoir pressurized constantly, plural valves C441 are installed to the reservoir 44 whereof one valve C441, which is connected to the cylinder requiring the fuel, may be opened alone. The battery 46 connected to the electrode whereof the negative pole is connected to the body 10. By combining with the fuel ejector in the embodiment 2, the applied voltage to the electrode will be reduced.

A rough estimation of an example whereof the ejector comprises "the electrical vibration chopper" for an internal combustion engine (FIG. 29) is demonstrated.

Supposing that a 4-cycle gasoline engine of 500 cc single-cylinder with the rotation rate of 6000 rpm is the case.

An ejection system is a direct ejection type fuel ejector to put all ejected fuel into a cylinder. Air temperature in the cylinder is supposed to be 100 Assuming that molecular weight of gasoline, the density and the ratio of air to fuel are 80 u, 0.7 g/cm$^3$ and 13:1 each. In this case, the amount of gasoline required for the two revolutions of the engine is estimated to be about 0.05 cc (5×10$^{10}$ μm). Assuming that the time required for the vaporization of the gasoline is negligible, the optimum timing to eject the gasoline is just the moment where induction have finished and the piston has passed the bottom dead center. In this case, since the pressure in the cylinder hardly increase by the vaporization of the gasoline, the maximum air inhalation is actualized. Gasoline is ejected during the period of 2.5 ms of compression process. The beginning of the ejection should be as late as possible for the prevention of knocking and as early as possible for the vaporization of gasoline droplets. When the injected gasoline stays in the cylinder, temperature of the fuel-air mixture in perfectly vaporized is lower than that in imperfectly vaporized. This is because latent heat due to vaporization is larger in the former. Therefore, the micronization of the gasoline droplets using the “electrical vibration chopper” rarely gives rise to knocking.

Here, supposing gasoline is injected during 1 ms just before the end of compression process (the beginning is 108 degrees past the bottom dead center of the crank angle), an ejection port is investigated. Assuming that the diameter of ejection orifice of the ejection port is 50 μm and the liquid whereof depth of 0.5 mm or less from the surface of an ejection port is ejected as droplets by decreasing of electrode voltage of the “electrical vibration chopper”, the amount of the droplets per ejection from one orifice is 9.8×10$^5$ μm$^3$. Supposing the electrode voltage is vibrated at 100 kHz, the number of ejection orifices required for the ejection wherein the amount of the gasoline is 5×10$^{10}$ μm per ms are roughly estimated to be 530. Assuming that the distance between adjacent ejection orifices is 200 μm, the diameter of the ejection port with 530 orifices is 10 mm at most. The ejected droplets, being elongated with a diameter of 50 μm and a length of 500 μm whereof surface area is larger than that of the spherical droplets with the same volume, are easy to vaporize and disrupted just after the ejection due to plural cohesion-centers within.

EMBODIMENT 4

Figure 7A:
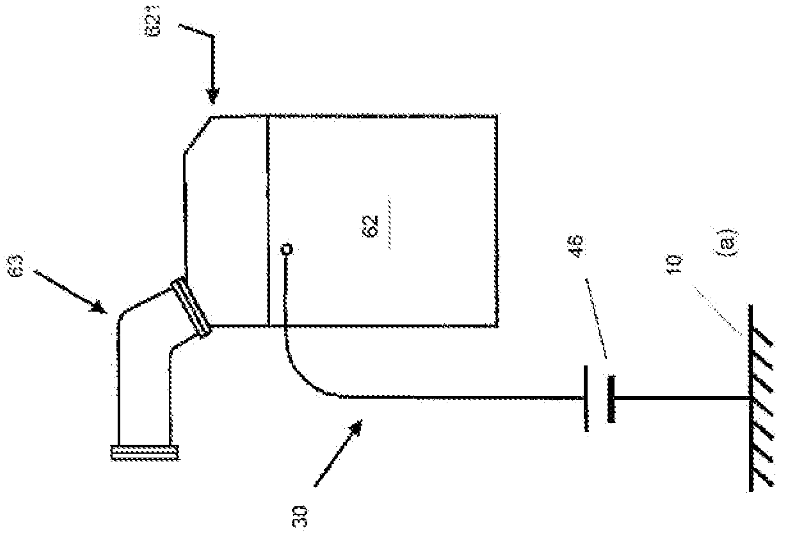
FIG. 7A is a diagram of an internal combustion engine (cylinder, cylinder head) connected with a battery for explaining the embodiment 4.
Figure 7B:
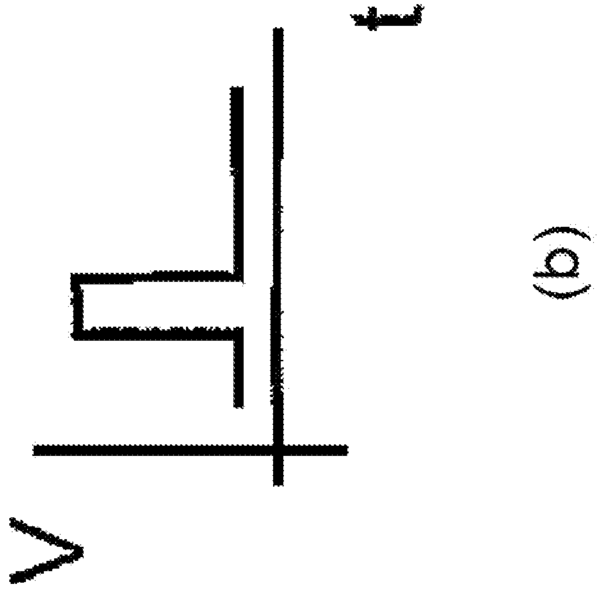
FIG. 7B is a diagram of applied voltage in the embodiment 4.
Figure 8:
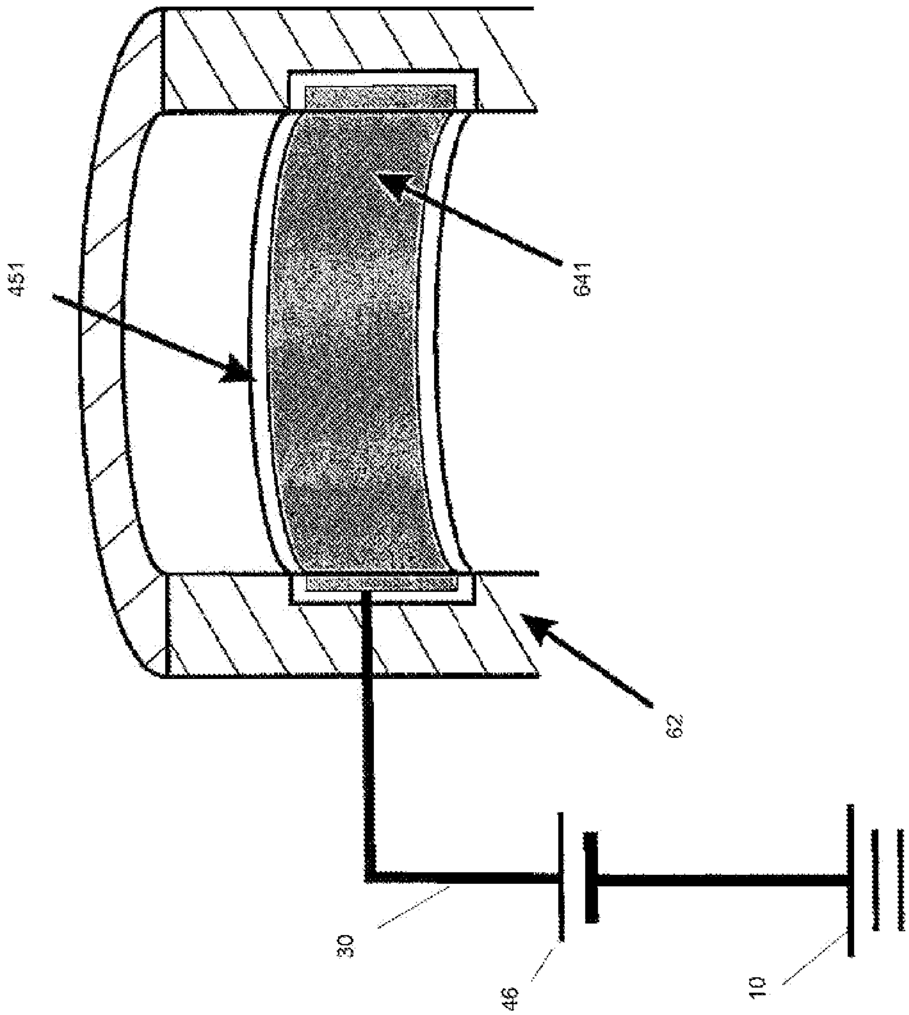
FIG. 8 is a diagram of a conductor ring furnished on the cylinder (cylinder head) inside for explaining the embodiment 4.

In the embodiment 4, the target object of the fuel ejector is explained with referring to FIG. 7 and FIG. 8.

The target object of the fuel ejector is featured where the combustion chamber of the target object is equipped with a cylinder, a piston and a cylinder head whereon positive voltage is applied in order to make Coulomb force act on the negatively charged micro-droplets, whereby the probability of collision with the wall of the cylinder and an upper surface of the piston and a cylinder head is increased.

Positive voltage is applied to the combustion chamber (cylinder or housing and so forth) of the internal combustion engine, whereby Coulomb attraction force acts on the negatively charged fuel droplets, therefore the collision probability of the fuel droplets with the wall of the combustion chamber is increased so that the vaporization of the fuel droplets is promoted. The fuel droplets is assumed to vaporize due to receiving heat on being taken into combustion wave surface. However, the speed of combustion wave is very high so that a part of the fuel droplets or the central part of the fuel droplet is left un-burned as a fuel droplet. Therefore, the acquisition of the heat (latent heat) required for vaporization of the fuel droplets in the combustion chamber within the interval ranging from about 0.1 ms to about several ms is an important factor which determines the combustion ratio and the timing of combustion.

The heat sources of the latent heat are the energy transfer on collisions between the droplets and gas molecules in air and collisions with the cylinder inner wall, surfaces of the piston head or the cylinder head, and radiation from these surfaces and the heat generated by compression in the compression process. Among these heat sources, main heat source is assumed to be the energy transfer by collisions and the heat by compression. The evaporation points are ranging from 30° C. to 200° C. for gasolines and from 200° C. to 350° C. for light oils in an atmospheric pressure. As increasing of pressure by compression, actual evaporation points is assumed to become higher than those above mentioned.

Figure 14A:
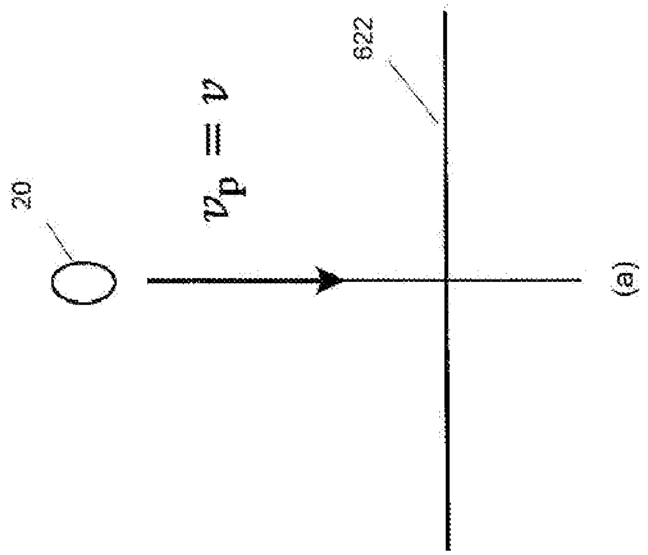
FIG. 14A is a diagram demonstrating the collision of a droplet in the cylinder (in the case of the droplet with an incidence angle of 90°).
Figure 14B:
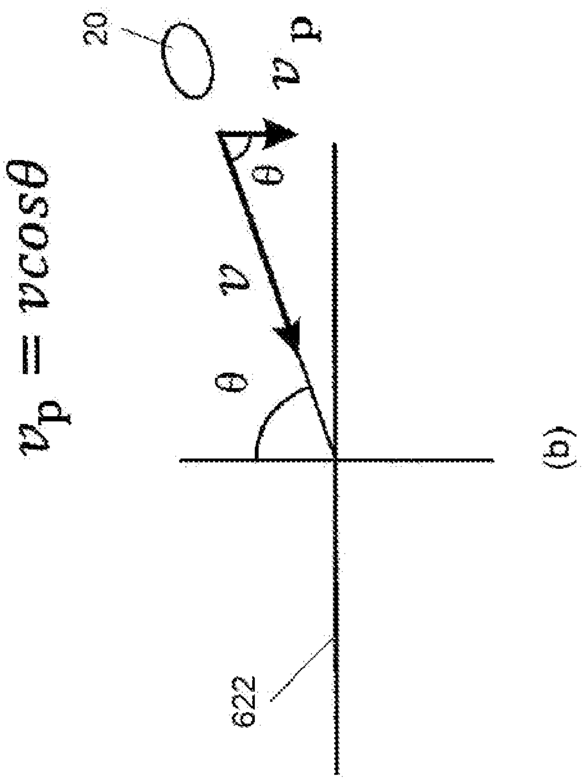
FIG. 14B is a diagram demonstrating the collision of a droplet in the cylinder (in the case of droplet incidence angle of θ).
Figure 36:
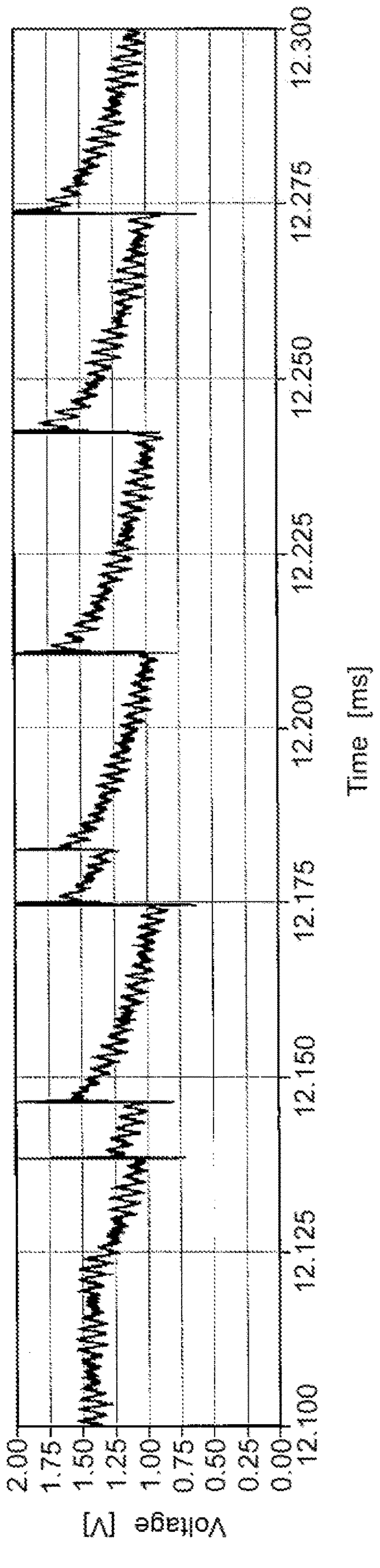
FIG. 36 is a magnification of FIG. 35 magnified further.

If negatively charged fuel droplets collide with the inner walls of the combustion chamber, the charges are transferred so that the inner walls become charged negatively (see FIG. 36). Therefore, Coulomb repulsion increases with time passing, the probability of collision between the fuel droplets and the inner walls becomes small (see FIG. 14, FIG. 14A demonstrates that the droplets 20 collide to the inner wall 622 in normal, and FIG. 14B demonstrates that the droplets collide to the inner wall 622 with an incidence angle θ. v represents the velocity of droplets 20 and $v_D$ represents the normal component of the velocity).

By applying positive voltage to the combustion chamber, Coulomb attraction acts on negatively charged fuel droplets, the collision probability between the fuel droplets and the inner wall of the combustion chamber increases and the interval where the fuel droplets adsorb to the wall surface becomes longer, whereby the amount of the heat received is assumed to increase.

Figure 19A:
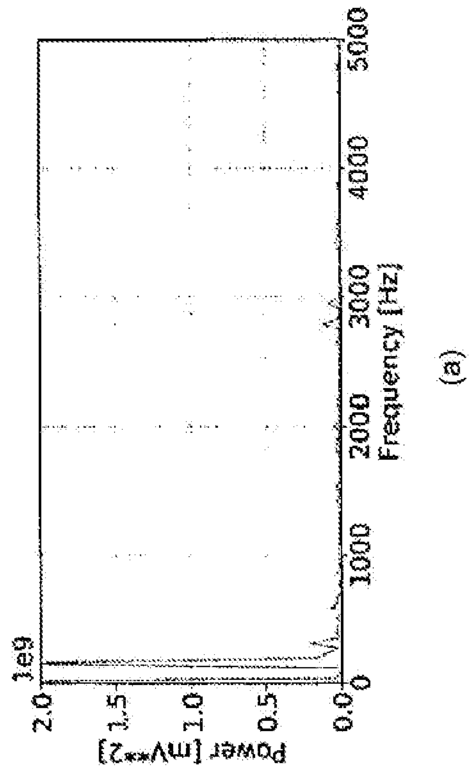
FIG. 19A is a diagram of the feature of the power spectrum deduced from FIG. 18 (induction process).
Figure 19B:
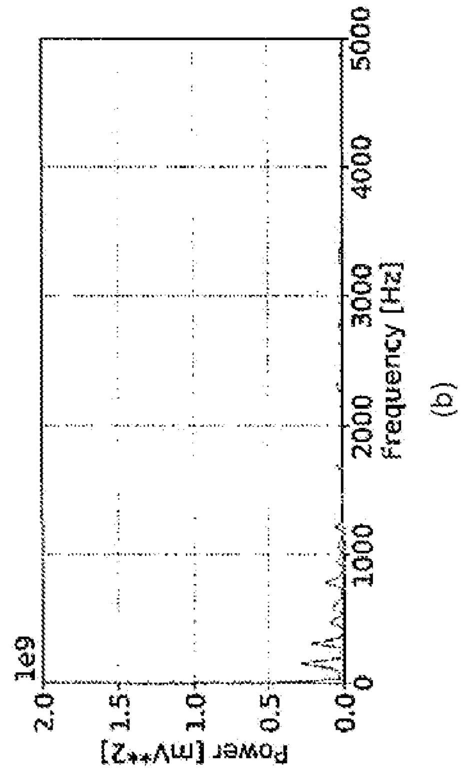
FIG. 19B is a diagram of the feature of the power spectrum deduced from FIG. 18 (compression process).
Figure 19C:
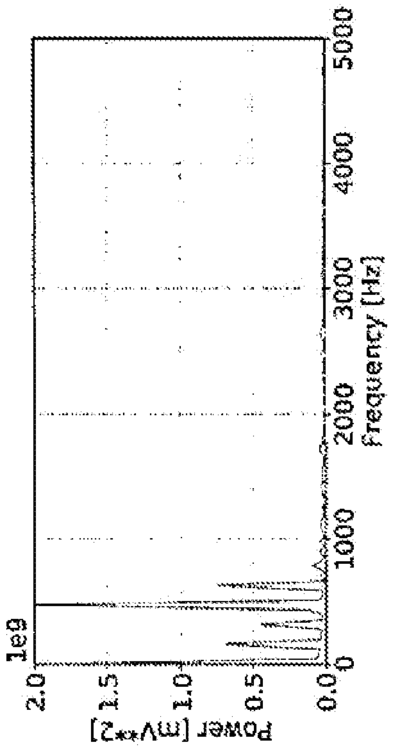
FIG. 19C is a diagram of the feature of the power spectrum deduced from FIG. 18 (combustion process).
Figure 37:
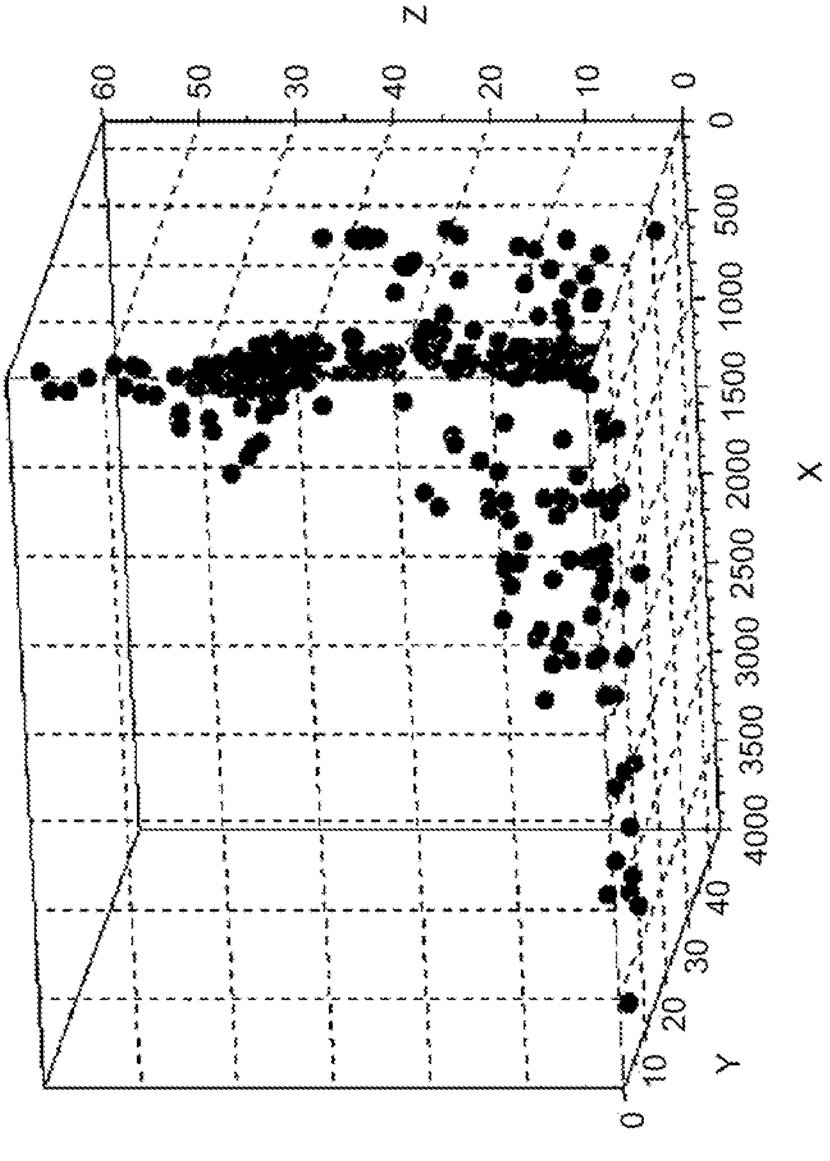
FIG. 37 is a diagram of the feature of ejected droplets in the insulated condition.
Figure 39:
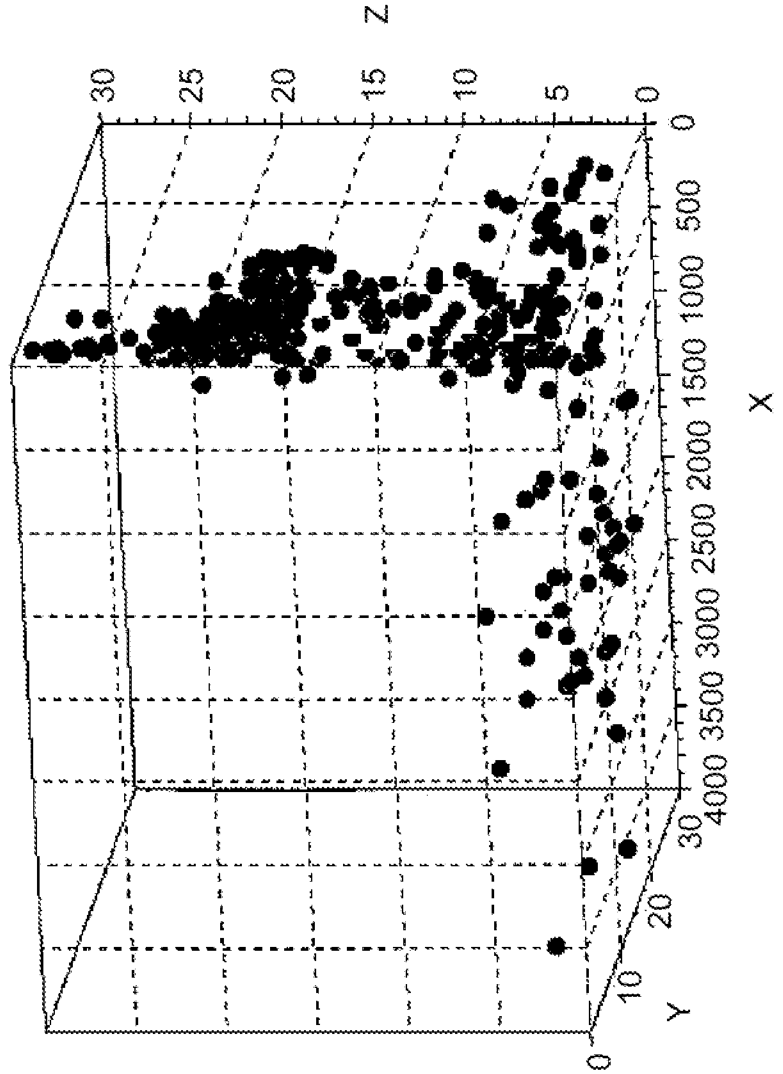
FIG. 39 is a diagram of the feature of ejected droplets in the condition of the present invention (electrically connected condition).
Figure 41A:
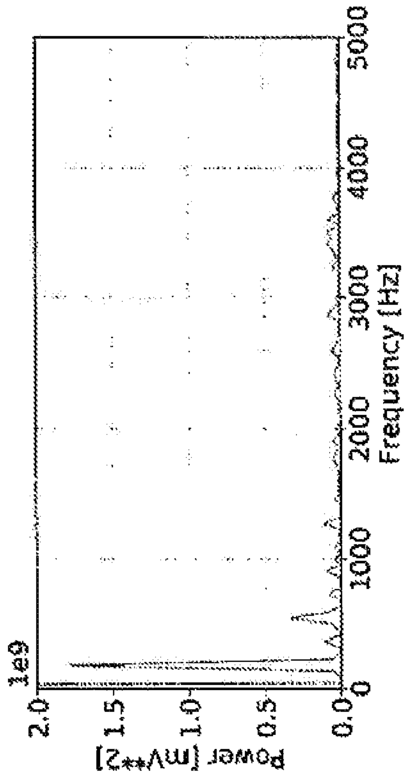
FIG. 41A is a diagram of the feature of power spectrum deduced from FIG. 40 (induction process).
Figure 41B:
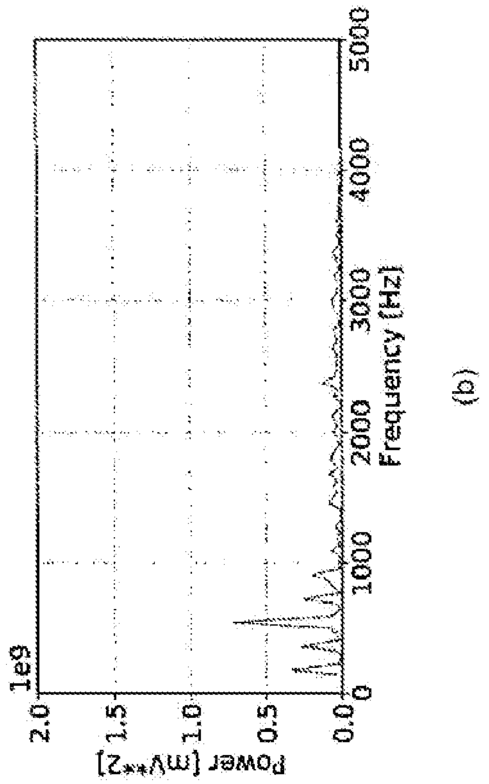
FIG. 41B is a diagram of the feature of power spectrum deduced from FIG. 40 (compression process).
Figure 41C:
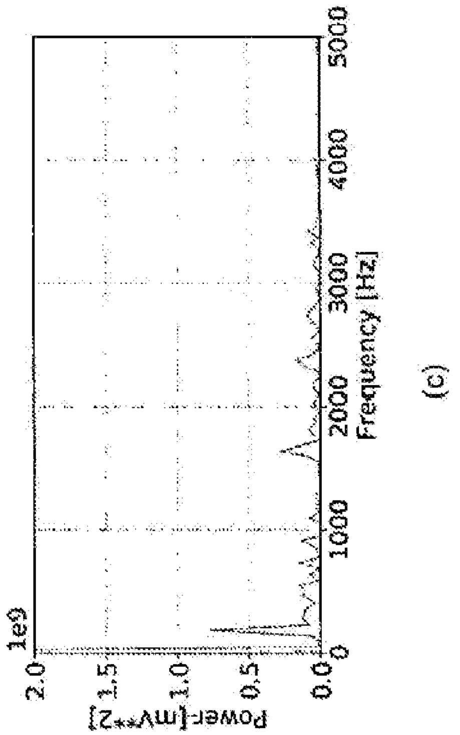
FIG. 41C is a diagram of the feature of power spectrum deduced from FIG. 40 (combustion process).

The effectiveness of the method of increasing potential of the combustion chamber becomes obvious by comparing the intensity of engine sound between in the condition of an injector insulated from an engine and in the condition of that electrically connected with the engine. The electrically connection means that the potential of the combustion chamber is set slightly higher, because potential drop of the engine connected becomes smaller than that insulated. The amount of the gasoline in the cylinder in the insulated condition is smaller than that in the connected condition (see FIGS. 37 and 39, FIG. 37 shows the feature of the ejected droplets in the insulated condition and FIG. 39 shows that in the connected condition.). Magnitude of the power of engine sound in combustion process in the insulated condition is smaller than that in the connected condition (see combustion process in FIG. 19C and combustion process in FIG. 41C). Assuming that the consequence is depends only on the amount of gasoline so that the combustion ratio of the fuel is equal, therefore, the amount of the gasoline burning in the exhaustion process (namely, un-burned and remained gasoline in the combustion process) is larger in the connected condition and the magnitude of the power of the engine sound at exhaustion process in the connected condition is expected to become larger.

Figure 19D:
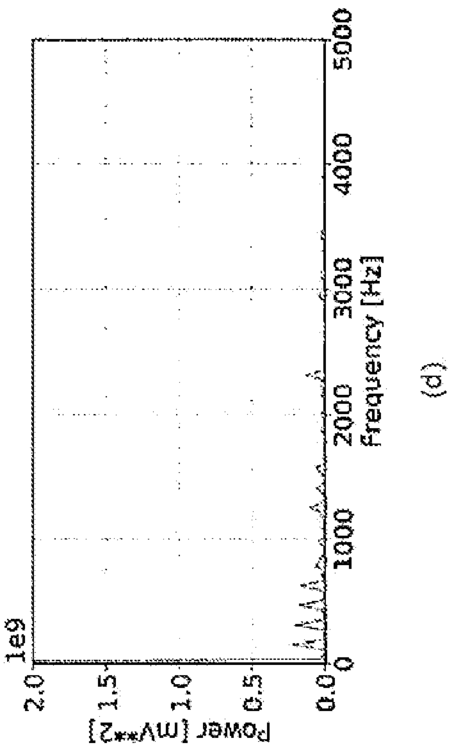
FIG. 19D is a diagram of the feature of the power spectrum deduced from FIG. 18 (exhaustion process).

However, as shown in the exhaustion process (FIG. 19D) and in the exhaustion process (FIG. 41D), magnitude of the power in the insulated condition is remarkably larger than that in the connected condition, therefore, the result is the opposite to that expected. Assuming that combustion in the exhaustion process in the insulated state is not different from that in the connected condition, the combustion ratio of the fuel at combustion process is expected to augment by increasing the collision probability of the fuel droplets with increasing the potential of the combustion chamber. By comparing the magnitude of power at combustion process in the insulated condition with that in the connected condition for a motorcycle (KTM DUKE, KTM Sport motorcycle from AG company), the latter was just a little larger and slightly high frequency component existed therein. The results of the measurements of torque and rotational speed showed that both the output and the torque in the connected condition were larger by about 50% than those in the insulated condition (see FIG. 27).

For the promotion of the efficiency of heat exchange in a combustion chamber of an internal combustion engine by increasing collision probability of charged fuel droplets, the potential of a cylinder, a piston or a cylinder head is made higher than ground potential. In order to make the potential higher than ground potential, the cylinder and so on are connected to the positive pole of a battery whereof the negative pole is connected to the body (see FIG. 7A and FIG. 8. In FIG. 7A, the cylinder 62 is connected to the positive pole of the battery 46 using the conducting wire 30 and the negative pole of the battery 46 is connected to the body 10). If the electrostatic capacity of the cylinder and so on is too large for the application of voltage, an electrode plate may be installed in the cylinder, the piston or the cylinder head whereto positive voltage is applied. For example, a ring shape belt electrode installed to the cylinder or the cylinder head is shown in FIG. 8 (in FIG. 8, the ring shape conductor belt 641 is installed to the cylinder (cylinder head) 62 intervened by the insulator 451 and connected to the positive pole of the battery 46). The starting time or the ending time of voltage applying are synchronized with the operation of a fuel pump or may be controlled by crank angle (FIG. 7B shows an example of the dependence of applied voltage on time).

EMBODIMENT 5

In the embodiment 5, the fuel ejector is explained by referring to FIG. 9-FIG. 12.

This fuel ejector, which equipped with actuators whereby liquid fuel is accelerated by the vibration of vibration plates, sensors which receives signals from detector observing the volume of flowing air per unit time, the rotation rate of an engine, the temperature of cooling water, the ratio of throttle opening and the voltage of a battery and so on and controllers to regulate the amount of the ejected fuel based on the information from the sensors, is characterized by the ejection of micro-droplets with a diameter of 50 μm or less from many ejection orifices with a diameter of 50 μm or less in the ejection port. By using this system, the evaporation of liquid fuel becomes easy, whereby thermal efficiency of an engine will be improved.

Combustion of liquid fuel results from the reaction of vaporized fuel molecules with oxygen in air (see "combustion engineering" Vol. 3, by Yukio Mizutani, Morikita Publishing 2017). Since the evaporation point of gasoline is about 80° C., most of gasoline is injected into a cylinder in liquid state. Therefore, the improvement of the evaporation rate of fuel droplets in a combustion chamber (cylinder, housing, etc) is an important factor to enhance thermal efficiency.

In this embodiment, the diameter of ejection orifices installed in the ejection port is 50 μm or less, whereby the diameter of the ejected fuel droplets is made to be 50 μm or less so as to facilitate the evaporation of the fuel droplets. Droplets with a small diameter are thermodynamically unstable as compared to droplets with a large diameter, easy to vaporize and easy to give rise to oxidation reaction, i.e., burn due to overpressure (De Gennes, Brochard-Wyart, Quere, Ver. 2 "Surface tension physics", Yoshioka 2017). The ratio of surface area to unit volume (specific surface area) increases as decreasing of the volume of a fuel droplet, therefore collision probability per unit volume with a gas molecule will augment. Moreover, the difference of momentum by colliding between a fuel droplet and a gas molecule increases as the mass of a fuel droplet is reduced, therefore thermal energy given by a collision becomes large.

Consequently, as the diameter of the droplets becomes smaller, time required for evaporation of liquid per unit volume becomes shorter, namely, time required for disappearance of the droplets is reduced. Experiments demonstrated that combustion speed $S_T$ of fuel droplets is in inverse proportion to the diameter of a droplet $d_m$ whereby the following empirical formula (Equation 11) was given:

(Equation 11)

$$S_T = \frac{3400}{d_m}(F/A - 0.012)(u')^{1.15} \tag{11}$$

Here, F/A represents the ratio of fuel to air, u' represents the intensity of fuel-air mixture turbulence ("Combustion engineering" written by Yukio Mizutani, vol. 3, 2017 from Morikita Publishing 2017).

If the mass of a fuel droplet are reduced by decreasing its diameter, the regulation of the movement of the charged droplets by electric field becomes easy.

Figure 9:
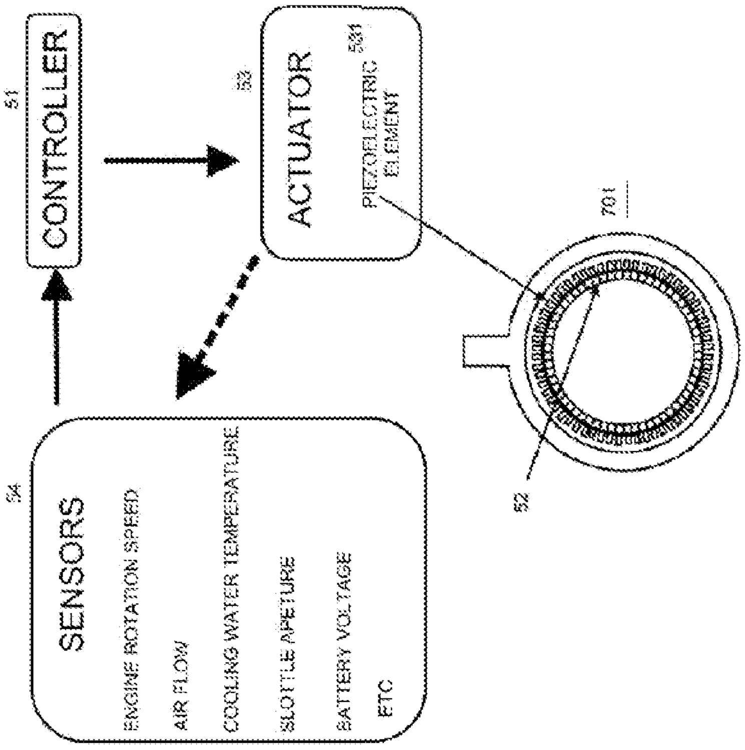
FIG. 9 is a diagram of a MEMS type fuel ejector for explaining the embodiment 5.

In order to actualize the diameter ranging from 10 to 50 μm of a fuel droplet ejected from a fuel ejector installed to an internal combustion engine, the techniques established for MEMS (Micro Electro Mechanical Systems) is used. MEMS is a device comprised an actuator, a sensor and a controller which are integrated on a substrate using microfabrication techniques. The components of the composition as a fuel ejector are, as shown in FIG. 9, an actuator 53 for ejecting fuel, sensors 54 for receiving signals from detectors observing the volume of flowing air per unit time, the rotation rate of an engine, the temperature of cooling water, the ratio of throttle opening and the voltage of a battery etc. and a controller 51 to regulate the amount of the ejected fuel based on the information from the sensors.

Inkjet printers wherein a MEMS is used as a head for ejecting fluid have already been on the market. In an inkjet printer head, in order to regulate the reaching flight distance of the droplets with high precision, electrically conductive ink droplets are accelerated by electric field and whereof position is controlled precisely by using deflection plate electrodes. Furthermore, the diameter of droplets are micronized for ultra-fine printing, and the frequency of ejection is made to be high for high speed printing ("Inkjet", Imaging Society of Japan, edited by Masahiko Fujii, Tokyo Denki University Publishing).

In a fuel ejectors for internal combustion engine, not the regulation of the position of the ejected droplets but the quantity of the ejected droplets per unit time is of importance. To actualize a fuel ejection MEMS, an incompatible problem where the diameter of the fuel droplets must be small and the quantity of the ejected fuel droplets per unit time must be large should be solved. Therefore, this embodiment proposes a MEMS type fuel ejector with many ejection orifices integrated at ejection port, whereby great many fuel micro-droplets are ejected simultaneously. The MEMS type fuel ejector is equipped with a controller 51 whereby the amount of the fed fuel is instantly changed corresponding to the rotation rate of the engine. In order to change the refueling volume, the number of working ejection cells 52 or the ejecting time is adjusted based on the information from the sensors 54.

Here, the number of the ejection orifices at the ejection port n is estimated on the assumption that the measured four-cycle single-cylinder engine with displacement volume of 450 CC was operated at the rotation rate of 6000 rpm with 20 litter/hour fuel consumption, and the fuel droplets ejected under the condition that the diameter of droplet, the ejection interval and the ejection frequency were 50 μm, 1 ms and 200 kHz, each. The above fuel consumption rate is assumed to be at maximum. The ejection frequency 200 kHz of fuel droplets has been achieved in an inkjet printer. The number of ejection orifices n is estimated as following (Equation 12):

(Equation 12)

$$n = \frac{20 \times 10^{16}/\mu m^3/60 \times 3000/\text{min} \cdot \text{rev}}{\frac{4}{3}\pi \times (50/2)^3/\mu m^3 \times 200/\text{kHz} \times 1/\text{ms}} \sim 10000 \quad (12)$$

Figure 10:
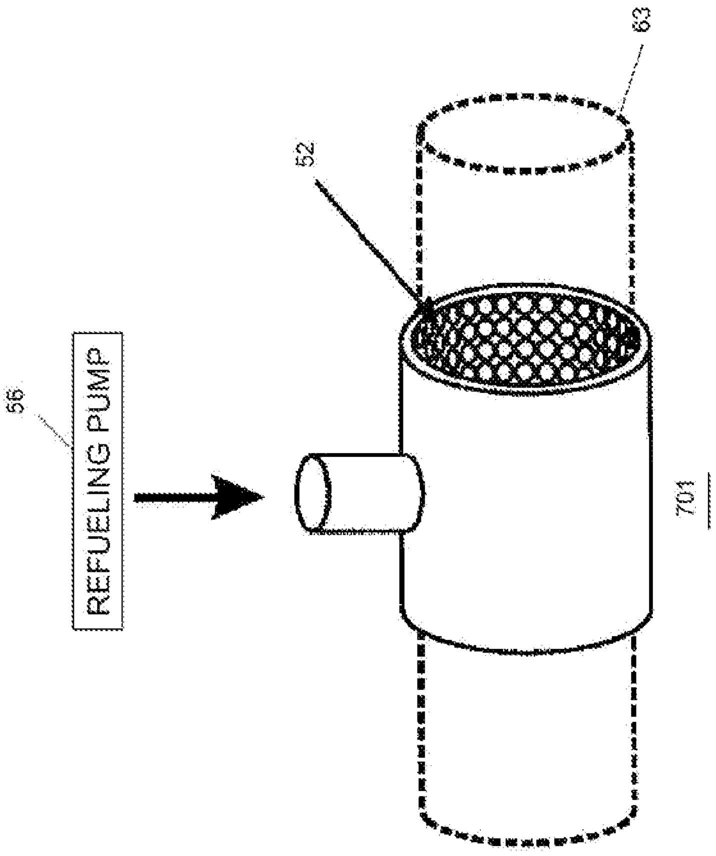
FIG. 10 is a diagram of the intake tube of the MEMS type fuel ejector for explaining the embodiment 5.
Figure 11:
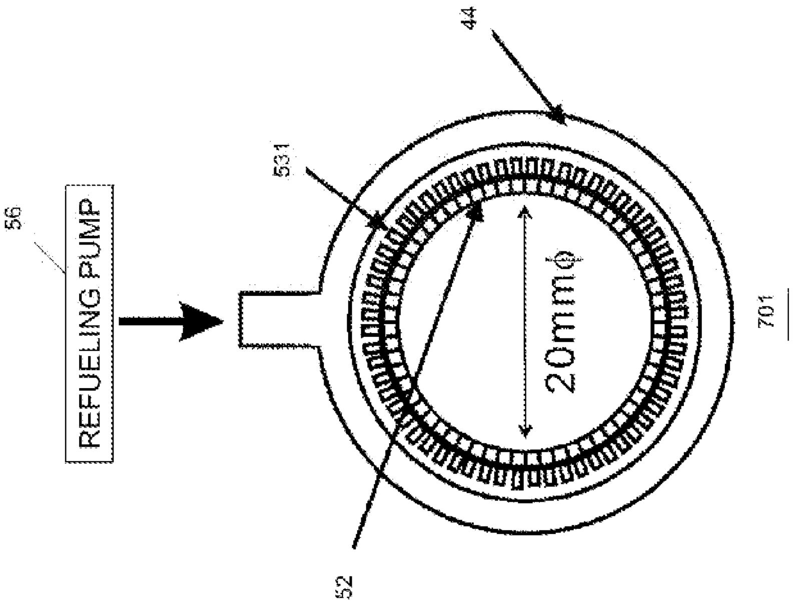
FIG. 11 is a diagram of the cross section of the MEMS type fuel ejector for explaining the embodiment 5.
Figure 12A:
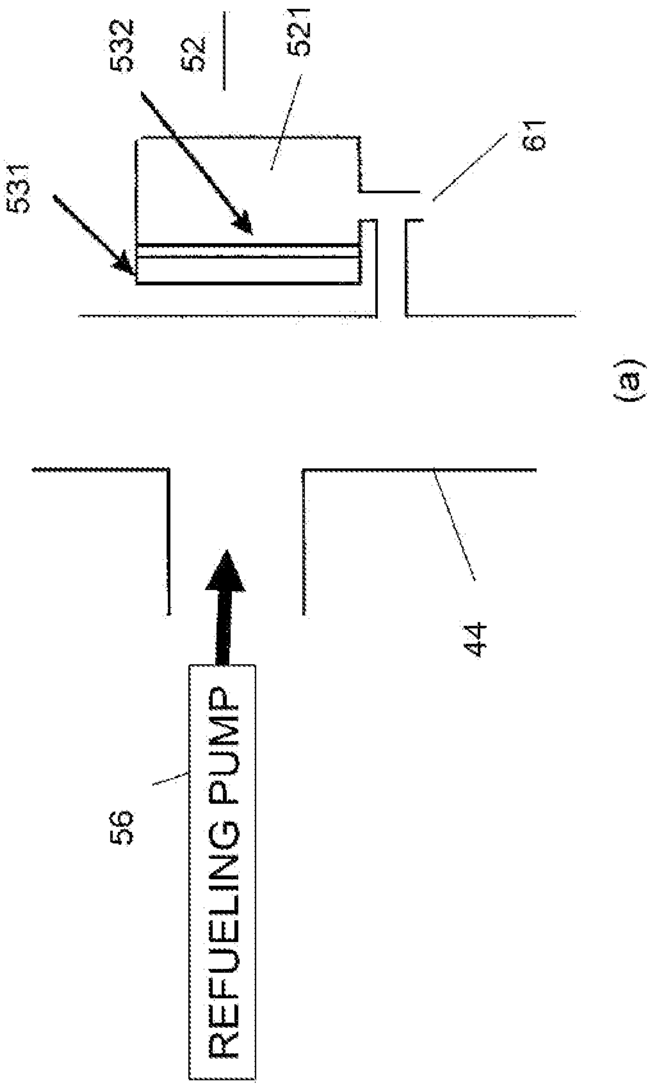
FIG. 12A is a diagram of the side view of an ejection cell for explaining the embodiment 5.
Figure 12B:
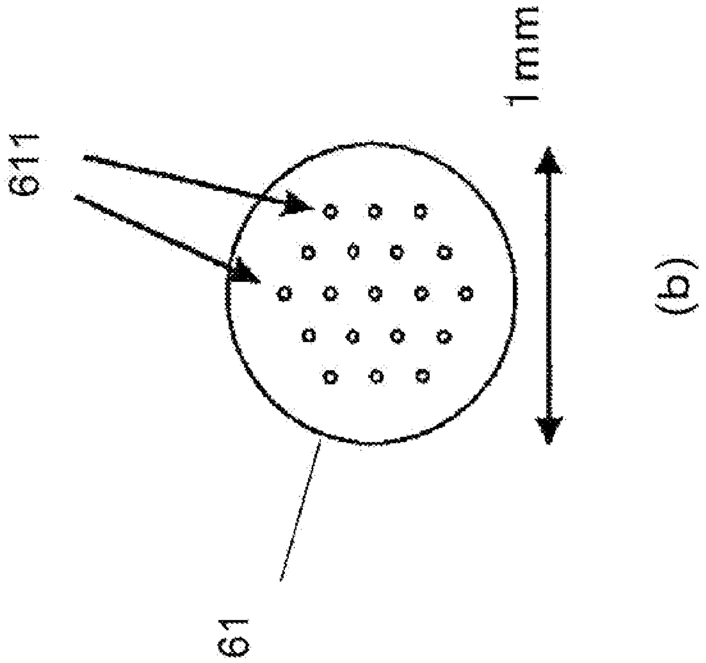
FIG. 12B is a diagram of the front view of the ejection cell shown in FIG. 12A.

The operation of the actuator 53 of the ejection system is driven by the oscillation of vibration plates using a piezoelectric element (piezo element), an ultrasonic vibrator or an electromagnet. An integrated fuel ejector equipped with a piezoelectric actuator is shown in FIG. 9-FIG. 12. As shown in FIG. 12A, pulse voltage is applied to the piezoelectric element 531 to transform the vibration plate 532 so as to vibrate, whereby the capacity of the pressure chamber 521 is changed to give rise to ejection of fuel droplets from the ejection port 61 of the ejection cell 52 comprising the fuel ejector (see FIGS. 10 and 11). By pluralizing the ejection orifice 611 in the ejection port 61 of the ejection cell 52, the number of the actuators can be reduced (see FIG. 12B). The number of the ejection orifice 611 with a diameter of 50 μm is 19 at the ejection port 61 as shown in the figure, so that the number of ejection cells becomes about 530. The amount of the ejected fuel droplets is equal to the transformation capacity of the pressure chamber 521, and the frequency of the piezoelectric element 531 is equal to the frequency of the pulse voltage. In the case of an indirect ejection type fuel ejector, the integrated fuel ejector is installed in the intake tube 63 as shown in FIG. 10. For the application to multi-cylinder engines, the fuel may be fed to all of the ejection cells 52 using a refueling pump 56 and a single reservoir 44 as shown in FIG. 11. This is the integrated fuel ejector and thus will also be applied to any ejector described in claims 1-3 and claim 5.

Hereinafter, in order to investigate the effect of flow electrification due to the ejection of droplets, the measurements of the potential of an injector or a carburetor and an engine, and the measurements of engine sound were performed for an internal combustion engine. The engines used for the measurements were installed to motorcycles (MEN 450 HONDA, 390 DUKE KMT) with feeding fuel by an injector and a motorcycle (KSE 125 HONDA) by a carburetor. The engines were electrically connected with the body frame, however, the injector and the carburetor was insulated. These engines were single-cylinder, therefore, analysis of the fluctuation of the potential and the engine sound was easy. The phenomena which occur in the single-cylinder engine at four processes, namely, from induction process to exhaustion process, also occur in multi-cylinder engines. The measurements were performed using an oscilloscope (PicoScope6 5444B PicoTechnology) and a passive probe (TA045 PicoTechnology) connected with the carburetor, the injector or the engine. A condenser microphone (EMM-6, Dayton Audio) was used for the measurements of engine sound.

The results of the experiments and interpretations are explained in the order the measurements of potential difference and the measurements of engine sound. The technique for the estimation of rotation rate from the engine sound has been actualized, while the techniques for analyzing the state of induction, combustion and exhaustion from the engine sound seem not to be general, thus, those are also explained.

A. Measurements of Potential

Figure 31:
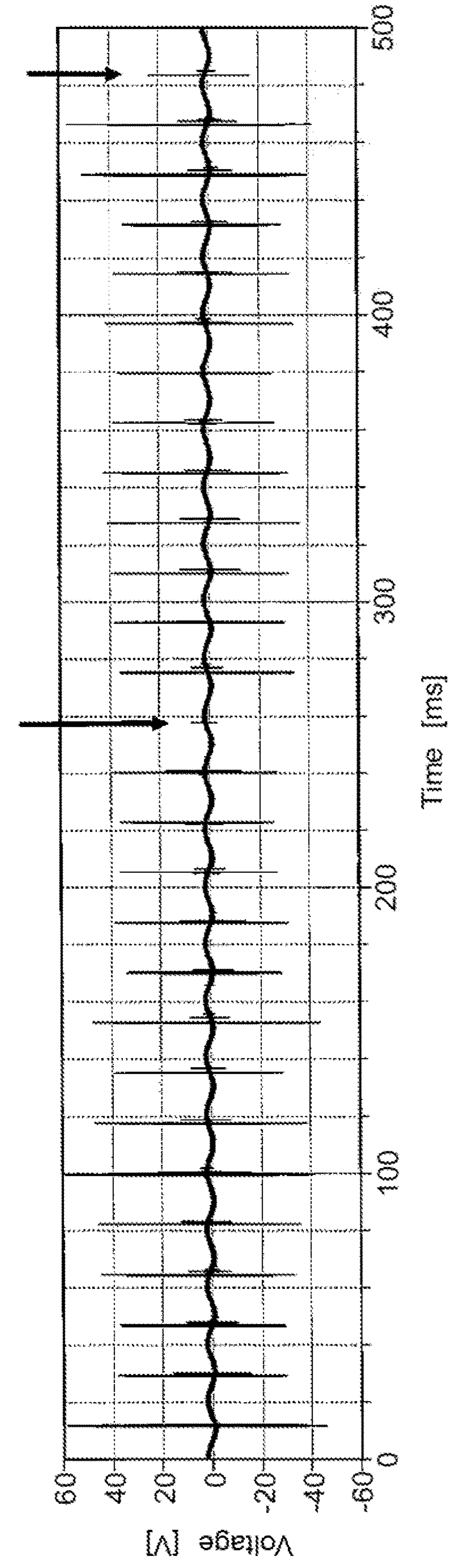
FIG. 31 is a diagram of the results of the potential measurements for the fuel injector in the insulated condition.
Figure 32:
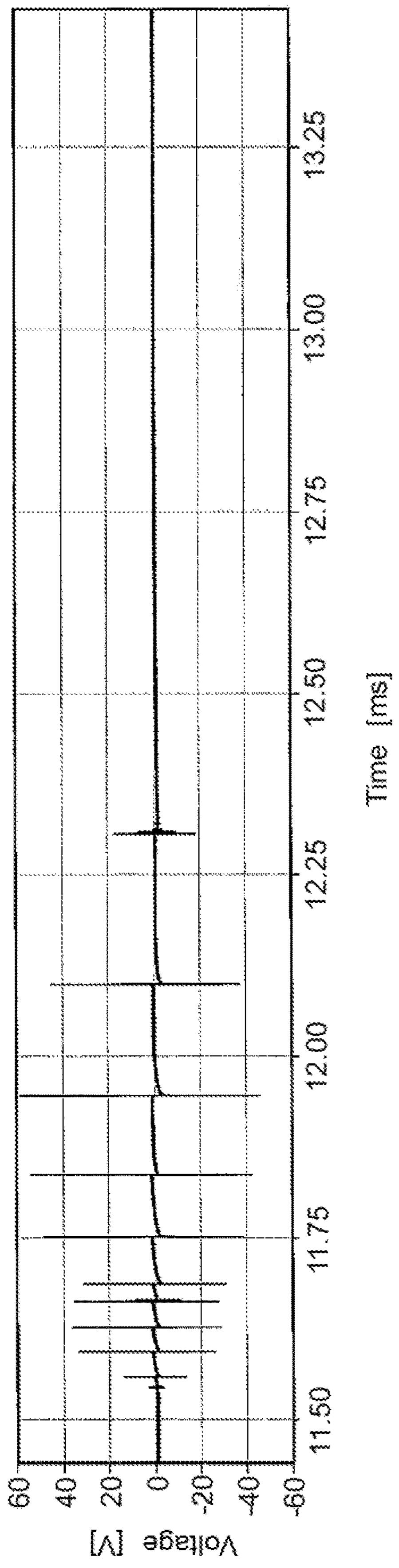
FIG. 32 is a magnification of the first impulse in FIG. 31.
Figure 33:
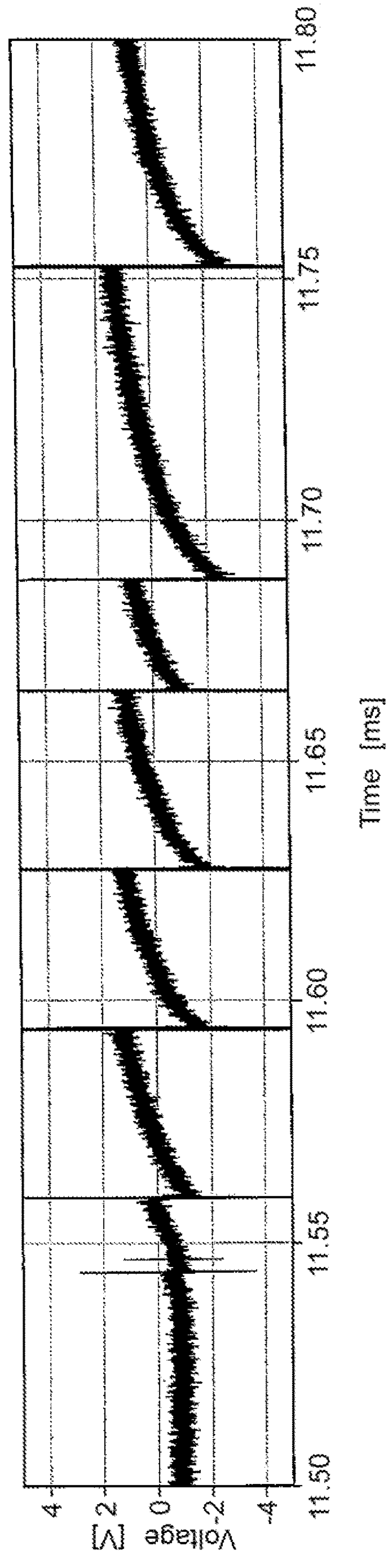
FIG. 33 is a magnification of FIG. 32 magnified further.

The results of the measurements of potential for an injector (HONDA MEN 450) in the insulated condition are shown in FIG. 31. The rotation rate of engine was 6900 rpm. The voltage fluctuation of 50 Hz is shown in FIG. 31 as noise. The period of the impulses with the amplitude of about 60 V is 17.5 ms, which is equal to that of intakes. FIG. 32 which is the magnification of the first impulse in FIG. 31 demonstrates that the impulse comprises plural pulse vibrations and a slight rise before the pulse vibrations. The inclination of potential rise becomes small with time and shows a tendency to saturation. The magnitude of the potential rise is about 3 V as shown in FIG. 33, the magnification of FIG. 32.

Figure 34:
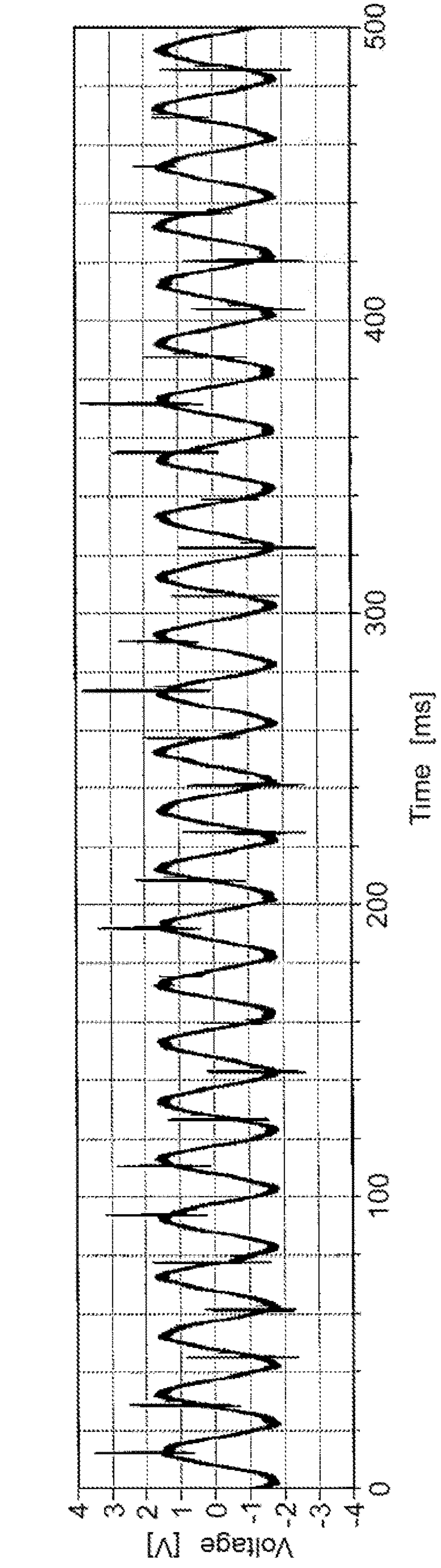
FIG. 34 is a diagram of the results of potential measurements for the engine in the insulated condition.
Figure 35:
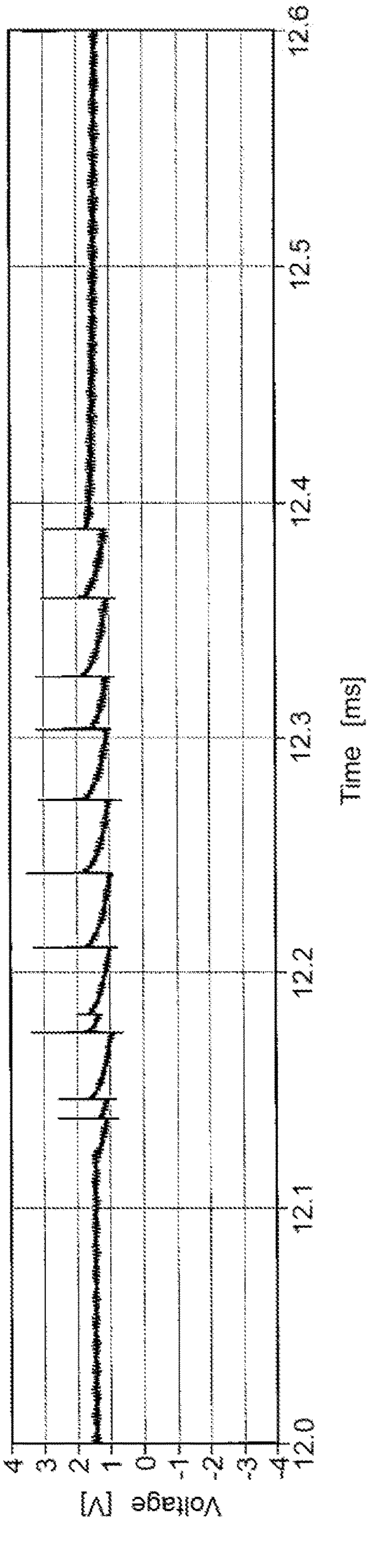
FIG. 35 is a magnification of the first impulse in FIG. 34.

The results of the measurements of potential for the engine in the insulated condition from the injector are shown in FIG. 34-FIG. 36. The rotation rate of the engine was 7300 rpm. In addition to the noises with 50 Hz, the impulses with the amplitude of about 3 V can be seen, whose period of 16.3 ms is equal to that of intakes. FIG. 35 which is the magnification of the first impulse in FIG. 34 demonstrates that the impulse comprises plural pulse vibrations and the descent of potential before the pulse vibration. The absolute value of the inclination of the potential descent becomes small with time and shows a tendency to saturation. The magnitude of the potential descent is about 0.6 V as shown in FIG. 36, the magnification of FIG. 35.

Similar potential changes were also observed for a motorcycle (KTM 390 DUKE) and a carburetor-installed motorcycle (HONDA KSE 125). The magnitude of potential changes became significantly large with increasing of the displacement and the rotation rate.

Figure 13:
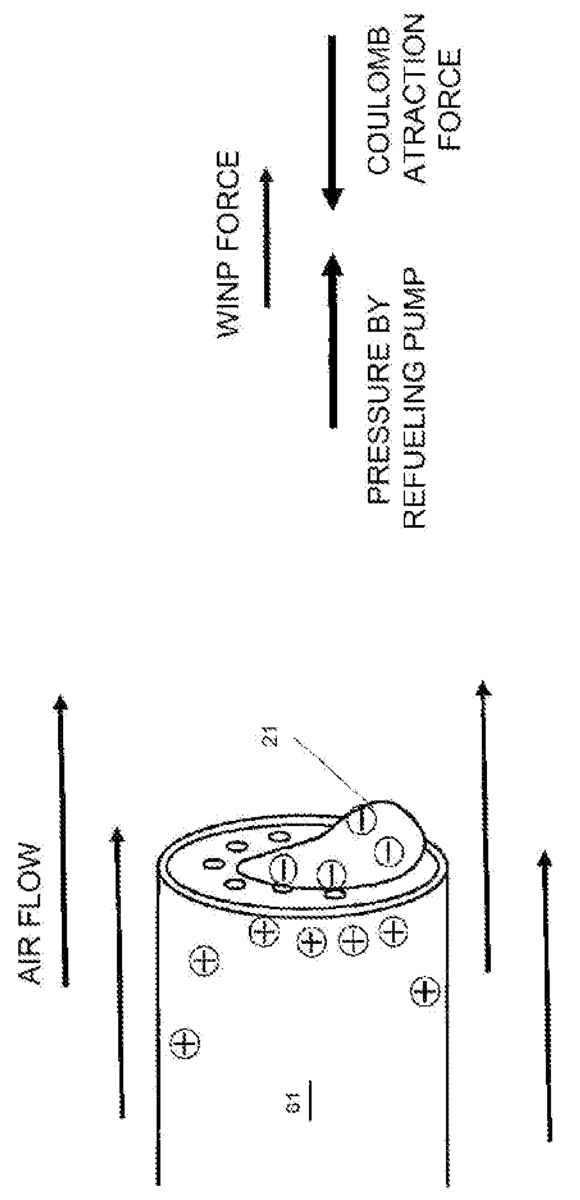
FIG. 13 is a diagram of pressure by refueling pump and Coulomb attraction acting on the fuel liquid at the ejection port.

Since the period of the impulses is equal to that of intakes, flow electrification is assumed to occur on feeding of gasoline by a refueling pump, whereby the injector becomes positively charged. Flow electrification is a phenomenon where a moving liquid becomes charged, whereby gasoline becomes negatively charged (see Non-patent Document 2). The existence of the plural potential rise and the pulse vibrations in one impulse means that gasoline droplets are intermittently ejected in one intake. The gasoline pressurized to an ejection port by the refueling pump becomes negatively charged, while the ejection port of the injector becomes positively charged, whereby Coulomb attraction acts between the gasoline and the ejection port. The balance of forces between the Coulomb attraction and the pressure by the pump is assumed to generate tentatively. However, the balance is collapsed by the fluctuation, such as a flow of air in an intake tube and so on, whereby the fuel is ejected as a droplet (see FIG. 13, wherein the state are shown that the fuel liquid 21 pushed out from the ejection port 61 by the pressure with the refueling pump becomes negatively charged and the ejection port 61 becomes positively charged. Coulomb attraction force, pressure by the pump and force by wind act on the fuel liquid 21). The above mentioned is reiterated, whereby the ejection of a droplet is assumed to become intermittent. The pulse vibration with a large amplitude (about 60 V) after the potential rise is assumed to occur due to sudden potential change.

The descent of potential of the engine is assumed that the inner wall of the cylinder and the upper surface of the piston receive electrons from the fuel droplets collided thereon. The fuel droplets or the group of fuel droplets formed on the way by disruption reach the cylinder inside in the order of ejection and intermittently collide with the cylinder surface, whereby the potential should change intermittently. When the droplets or the groups of the droplets stop colliding with the cylinder surface and the electron supply ends, whereby the potential changes suddenly. This is assumed to be the reason for the pulse vibrations with an amplitude of about 4 V.

The potential of the injector connected with the engine (HONDA MEN 450) using a copper wire of a diameter of 2 mm were measured. The results are shown in FIG. 15. The rotation rate of the engine was 8000 rpm. The period of 15.0 ms of pulse vibrations with an amplitude of near 40 V was equal to that of intakes. FIG. 16, the magnification of the first impulse in FIG. 15, demonstrates that the impulse comprises plural pulse vibrations. A slight descent of potential before the pulse vibration. The descent is as small as less than 0.3 V as shown in FIG. 17, the magnification of FIG. 16.

Figure 38:
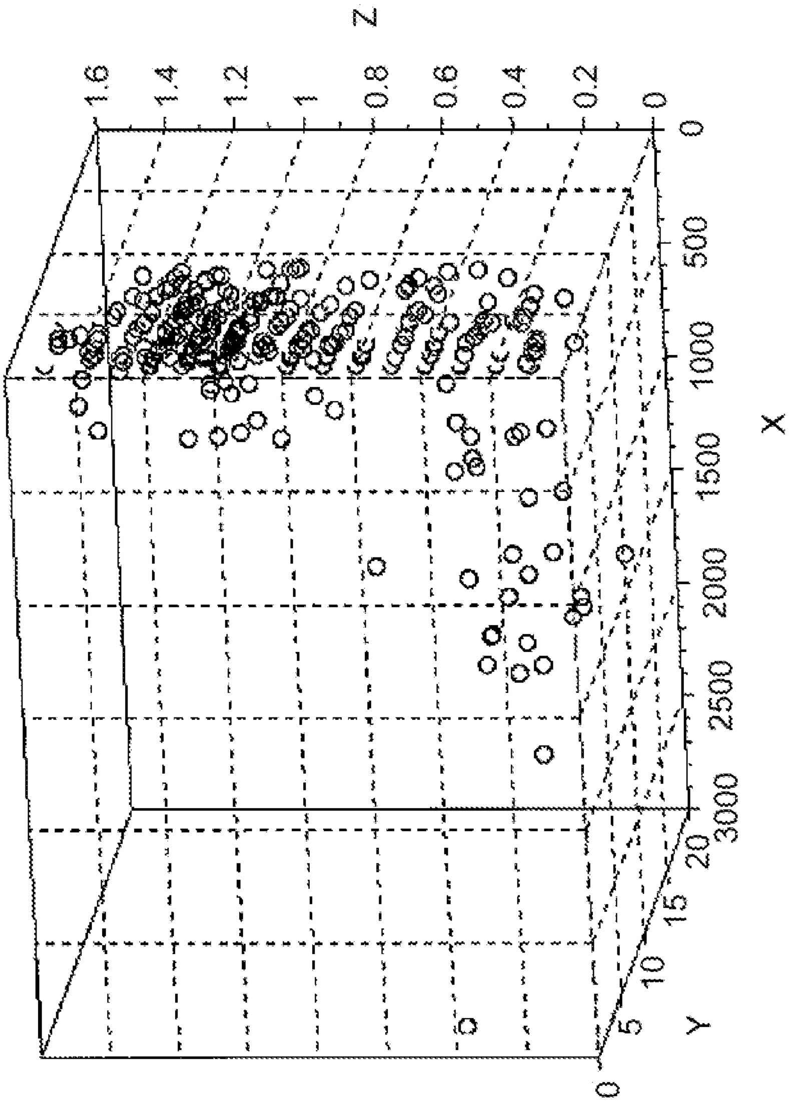
FIG. 38 is a diagram of the feature of droplets reached the cylinder in the insulated condition.

The ejection and the arrival of the droplets in 28 times of intakes in FIG. 15-FIG. 17 and FIG. 31-FIG. 36 were investigated, whose feature is explained with FIG. 37 to FIG. 39.

FIG. 37 demonstrates the quantities concerning the pulse vibrations resulted from the measurements of the potential of the injector in the insulated condition shown in FIG. 31-FIG. 33. X-axis represents the starting time of the each pulse vibrations wherein the origin is the starting time of the first pulse vibration, Y-axis represents the order of these pulse vibrations, and Z-axis represents the magnitude of the first maximum of the pulse vibration. The discussion above is not so exact, since the starting time of the first pulse vibration should be different in each impulses. The magnitude of the first maximum of the pulse vibration is adopted as a quantity whereby the amount of the charges transferred is roughly estimated. Since the starting time of the pulse vibration can be considered as the ejecting time of the fuel liquid, FIG. 37 shows the feature of the ejection of the fuel liquid.

Most of the fuel droplets are ejected within about 0.8 ms from the beginning of the ejection. Therefore, the range of distribution of the ejecting time of the droplets is considered to be about 0.8 ms. However, not a small number of droplets are ejected in the interval from 1 ms to 4 ms where the maximum amplitudes of pulse vibrations decreases gradually. Most droplets are ejected by the 10th ejection, but the ejection times are distributed in a wide range near the 40th ejection. The amplitudes of the first maxima of the pulse vibrations are distributed in a wide range from 1 V to near 60 V. Assuming that the volume of the droplets is in proportional to the amount of charges, this shows that the range of the distribution of the droplet volume is wide.

FIG. 38 demonstrates the quantities concerning the pulse vibrations resulted from the measurements of the potential of the engine in the insulated condition shown in FIG. 31 to 33. X-axis, Y-axis and Z-axis represent the same as those in FIG. 37. Since the starting time of the pulse vibrations can be considered as the ending time of the arrival of the fuel droplets or the groups of fuel droplets at the inner wall of the cylinder, FIG. 38 demonstrates the feature of the arrival of the fuel droplets. Most of the droplets reach within 0.6 ms from the arriving time of the first droplet. Therefore, the range of the arriving time of the droplets can be interpreted as about 0.6 ms.

Moreover, almost all droplets arrive by the 15th ejection. The amplitudes of the first maxima of the pulse vibrations for the fuel droplets arrived within 0.6 ms are distributed up to nearly 1.5V, but those for the fuel droplets arrived later are distributed in 0.5 V or less.

Making a comparison between the results in FIG. 37 and those in FIG. 38, the fuel droplets ejected late are not put into the cylinder, though they are ejected. This problem is discussed later together with the results of the measurements of engine sound in "B Measurements of Engine Sound".

FIG. 39 demonstrates the quantities concerning the pulse vibrations resulted from the measurements of potential in the connected condition shown in FIG. 15-FIG. 17. X-axis, Y-axis and Z-axis represent the same as those in FIG. 37. The amplitudes of the pulse vibrations have two distributions; one is ranging from 15 V to 25 V and the other is less than 5 V. Most of the droplets were ejected within 0.5 ms. The reason why the amplitudes of the pulses ejected late were less than 5 V is presumed that the volume of the droplets becomes small. The fuel droplets densely distributed ranging from 15 V to 25 V were in the range of ejection order less than the 15th ejection.

Assuming that the amount of the charge in the fuel droplets is determined by the pressure applied to the liquid in the fuel injector and the area of the flow path wall, it must be identical between in the isolated condition and in the connected condition. However, the maximum amplitude of pulse vibration in the connected condition is about 40 V (FIG. 15), whereby it is smaller than that of 60 V in the isolated condition (FIG. 31). The reason is assumed that the electrostatic capacity of the ejection port (ejection system) is increased by electrically connected, whereby the increment of the potential at the ejection port becomes small and Coulomb attraction acting on the charged gasoline liquid decreases, therefore, the droplets are ejected with a small pressure applied.

Making a comparison between the results shown in FIG. 39 and FIG. 37, the interval of the ejection of droplets is short as compared to the insulated condition and the range of the distribution of droplet volume is narrow. These results also demonstrate that Coulomb attraction acting on the droplets is small in the connected condition, whereby the ejection of droplets occurs with a small pressure applied.

B Measurements of Engine Sound

An engine is presumed to be a system which converts a part of energy generated by burning of fuel into an energy of sound.

Assuming that the rotation rate of the engine is constant, energy is generated in combustion process, wherein opening and shutting of an intake valve and an exhaust one reiterate periodically with the proceeding of the process, whereby the structure as a vibration tube and gas flow change, therefore, the engine sound is changed periodically. Supposing the magnitude of the energy of sound is in proportion to the energy generated by burning of the fuel, the conditions of induction, combustion and exhaustion can be judged by measuring the engine sound.

The energy of sound in a period per unit volume (energy density) $\langle E \rangle$, which can be represented as (Equation 13), is proportional to a square of frequency f and that of amplitude A.

(Equation 13)

$$\langle E\rangle = 2\pi^2 \rho f^2 A^2 \tag{13}$$

Here, p represents the density of medium through which sound is transmitted. The intensity of sound I is equal to the energy to be transmitted through a unit area per unit time, therefore, it is given as (Equation 14):

(Equation 14)

$$I = 2\pi^2 \rho f^2 A^2 v \tag{14}$$

Here, v represents the velocity of sound in the medium. A microphone detects the pressure of sound p and outputs as voltage signal. The relation between the pressure of sound p and the intensity of sound I is expressed as (Equation 15):

(Equation 15)

$$I = \frac{P^2}{2\rho v} \tag{15}$$

By Fourier transform of the measured waveform (voltage signal) x(t), an amplitude spectrum X(f) is deduced as a Fourier coefficient (Equation 16):

(Equation 16)

$$X(f) = \int_{-\infty}^{\infty} x(t)\,\exp(-j2\pi ft)dt \tag{16}$$

Energy can be deduced by integrating the waveform x(t) squared, therefore the square of the amplitude spectrum is equal to the energy according to Perceval equation (Equation 17):

(Equation 17)

$$\int_{-\infty}^{\infty} |x(t)|^2 dt = \int_{-\infty}^{\infty} |X(f)|^2 df \tag{17}$$

Since a waveform obtained by the measurement is a discrete series, discrete Fourier coefficient $X_k$ is deduced as a Fourier transform of waveform $x_k$ at the sampling points with number N in the analysis interval (Equation 18).

(Equation 18)

$$X_k = \sum_{n=0}^{N-1} x_n \exp\left(-j2\pi\frac{nk}{N}\right) \tag{18}$$

Therefore, power spectrum P(k) which is an energy per unit time is given by (Equation 19):

(Equation 19)

$$P(k) = |X(k)|^2 = X(k) * X(k) \tag{19}$$

The measurements of engine sound and the measurements of potential were carried out simultaneously. Due to the distance between the microphone and the engine being 30 cm, the signal of engine sound has a delay of 1 ms from the corresponding signal of potential. The rotation rate of engine estimated from the period of the impulses obtained by the measurement of potential are ranging from 5000 rpm to 6000 rpm (period of four processes, namely, induction process, compression process, combustion process and exhaustion process, ranging from 24 ms to 20 ms).

Analysis of the engine sound was performed as below. Assuming that the period of each process was identical, one period of a cycle was divided into four short intervals for each four cycles, whereby 16 short intervals were obtained. The four intervals in one cycle was labelled with a, b, c and d in due order with a suffix from 1 to 4 indicating every four cycles, whereby induction processes were designated by $a_1$, $a_2$, $a_3$ and $a_6$ and those of compression processes by $b_1$, $b_2$, $b_3$ and $b_4$. Combustion process and exhaustion process were the same. In a fitting of spectrum analysis, these four intervals with a suffix from 1 to 4 were considered to be a continuous interval, calculations for induction process, compression process, combustion process and exhaustion process were simultaneously performed. The reason why fitting was performed for 4 cycles is to make the resolution of frequency high by elongating the analytic interval.

Since starting time of the induction process is unknown, supposing as below:

(1) The induction process starts (opening of the intake valve) before the beginning of the ejection of a gasoline droplet.
(2) The starting time of induction process (time to open an intake valve) is equal in the insulated condition and in the connected condition. In addition, the starting time of the fitting is changed by 0.05 ms, the starting time that satisfies the following conditions is assumed to be the starting time of the induction process:
(1) The power of the compression process is the minimum, since both the intake valve and the exhaust valve are closed and no energy is newly generated.
(2) Components of frequency change, if any, where one process displaces the next.

Figure 40:
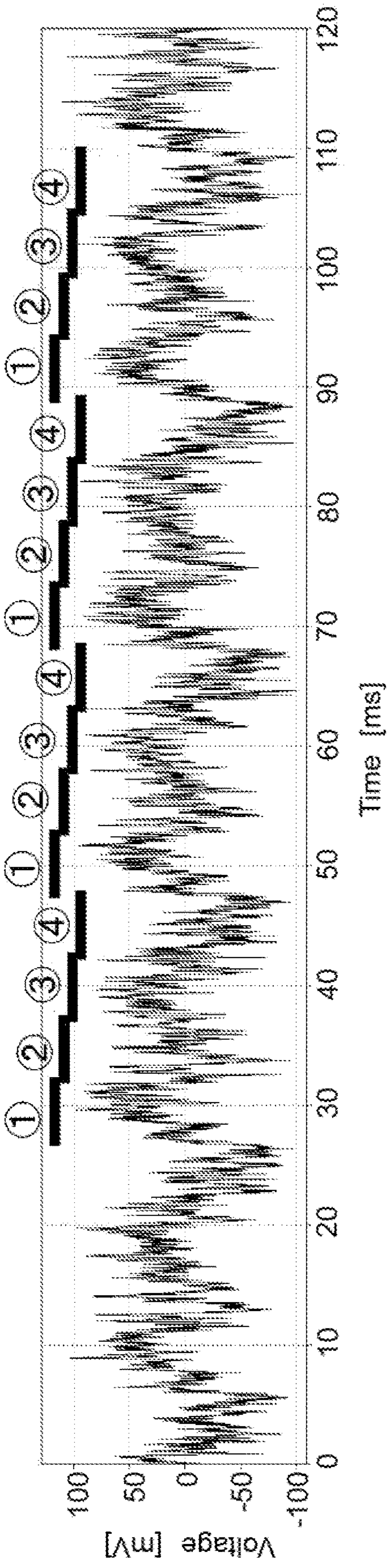
FIG. 40 is a diagram of the results of the measurements for engine sound in the insulated condition.
Figure 41D:
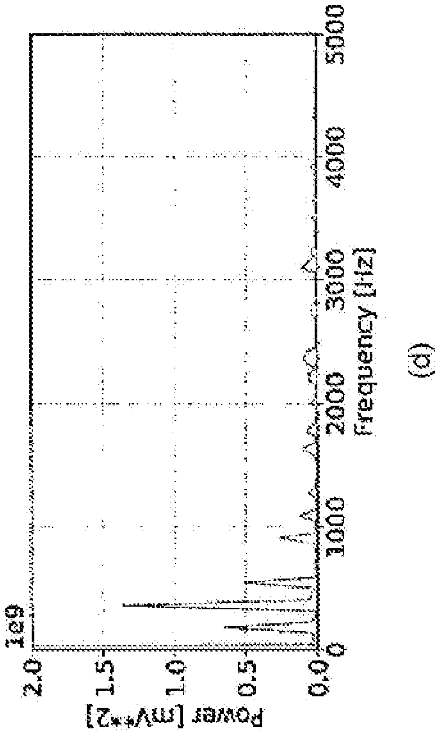
FIG. 41D is a diagram of the feature of power spectrum deduced from FIG. 40 (exhaustion process).

Figures concerning the results of the measurements and analyses are shown as below. The waveform of engine sound for a motorcycle (HONDA MEN 450) in the insulated condition, namely, the injector is isolated from the engine is shown in (FIG. 40), power spectra of engine sound, namely, the dependence of the power of the engine sound on frequency, is shown in the order of induction process (FIG. 41A), compression process (FIG. 41B), combustion process (FIG. 41C) and exhaustion process (FIG. 41D). In FIG. 40, the intervals of each four cycles and the 16 short intervals obtained by dividing every one cycle to four are shown. (In FIG. 40, horizontal bars above the waveform indicate the intervals in the order from the high to the low for (1) induction process, (2) compression process, (3) combustion process and (4) exhaustion process. Spectrum analysis was performed on four cycles of these four processes).

Figure 18:
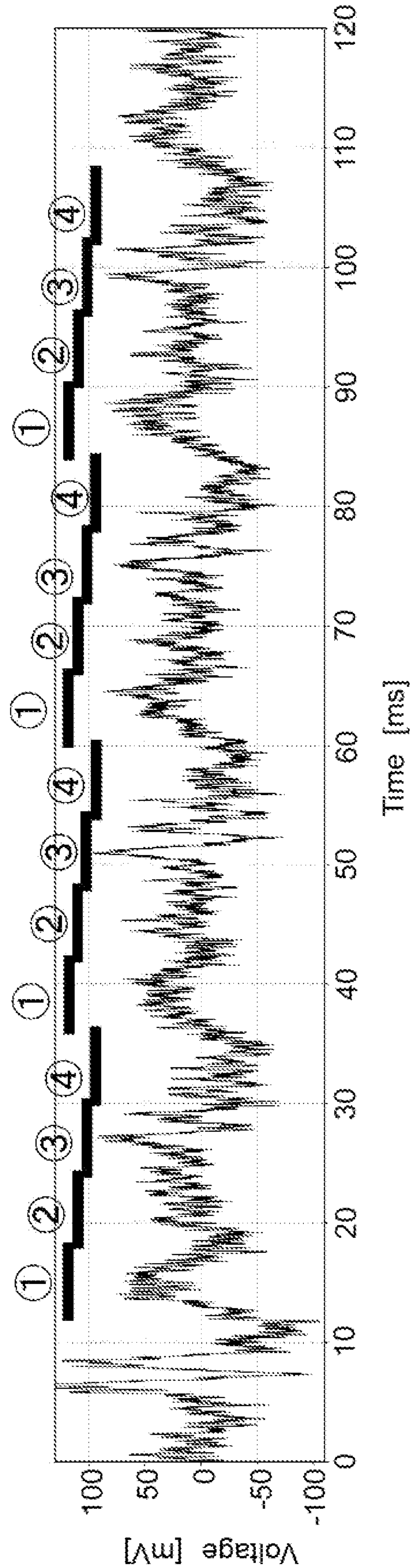
FIG. 18 is a diagram of the feature of the measured engine sound in the electrically connected condition.

In addition, the results of the measurements in the condition where the injector is connected with the engine are similarly shown in FIG. 18 and FIG. 19. FIG. 18 shows the spectrum of engine sound (waveform) in the condition where the injector and the engine of the motorcycle (HONDA MEN 450) are electrically connected (In FIG. 18, horizontal bars above the waveform indicate the intervals in the order from the high to the low for (1) induction process, (2) compression process, (3) combustion process and (4) exhaustion process. Spectrum analysis was made on four cycles of these four processes.). The dependence of the power of engine sound on frequency (power spectrum) is shown in FIG. 19A for induction process, FIG. 19B for compression process, FIG. 19C for combustion process and FIG. 19D for exhaustion process.

Similarly, the results for the motorcycle (KTM 390 DUKE) are shown in FIG. 42-FIG. 43 and FIG. 20-FIG. 21 each.

Figure 42:
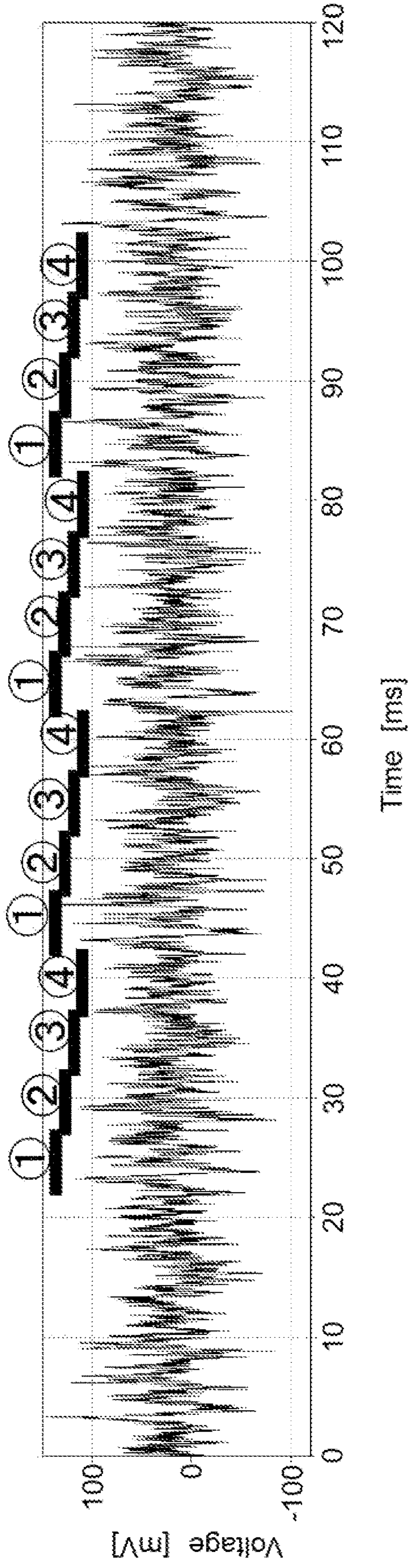
FIG. 42 is a diagram of the feature of the results of the measurements for engine sound in insulated condition.
Figure 43A:
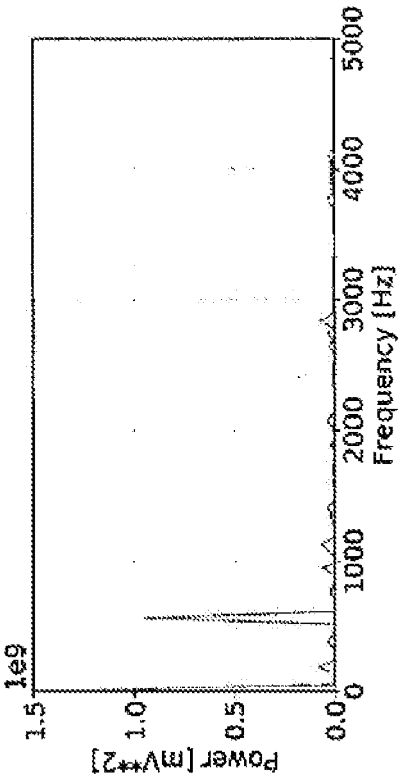
FIG. 43A is a diagram of the feature of power spectrum deduced from FIG. 42 (induction process).
Figure 43B:
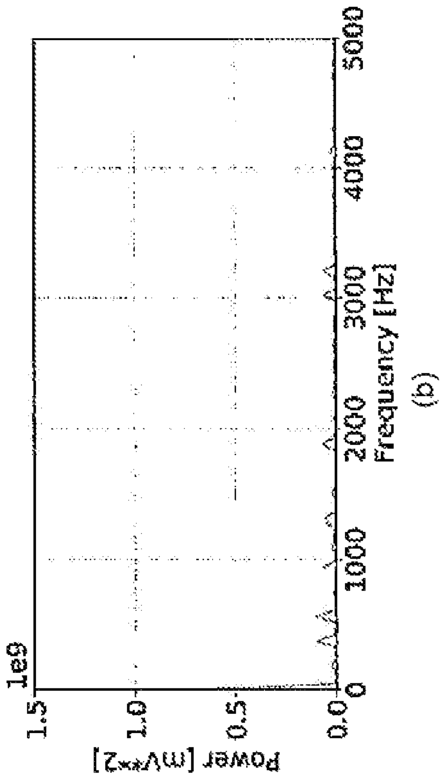
FIG. 43B is a diagram of the feature of power spectrum deduced from FIG. 42 (compression process).
Figure 43C:
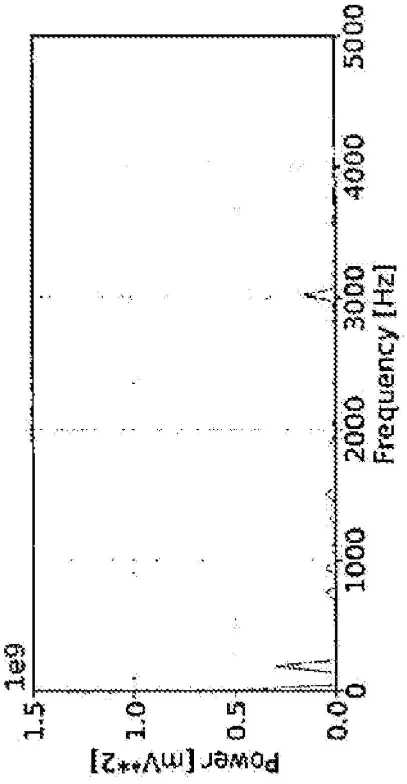
FIG. 43C is a diagram of the feature of power spectrum deduced from FIG. 42 (combustion process).
Figure 43D:
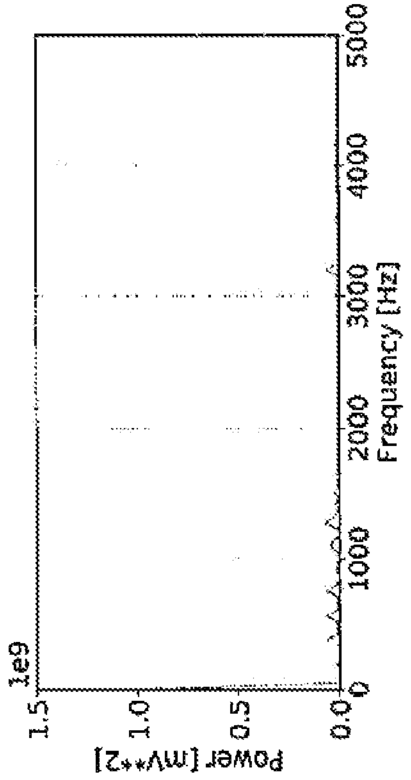
FIG. 43D is a diagram of the feature of power spectrum deduced from FIG. 42 (exhaustion process).

FIG. 42 shows the spectrum of engine sound (waveform) in the condition where the injector is isolated from the engine of the motorcycle (KTM 390 DUKE), and the dependence of the power of engine sound on frequency (power spectrum) is shown in FIG. 43A for the induction process, FIG. 43B for the compression process, FIG. 43C for the combustion process and FIG. 43D for the exhaustion process (In FIG. 42, horizontal bars above the waveform indicate the intervals in the order from the high to the low for (1) induction process, (2) compression process, (3) combustion process and (4) exhaustion process. The spectrum analysis was made on four cycles of these four processes.).

Figure 20:
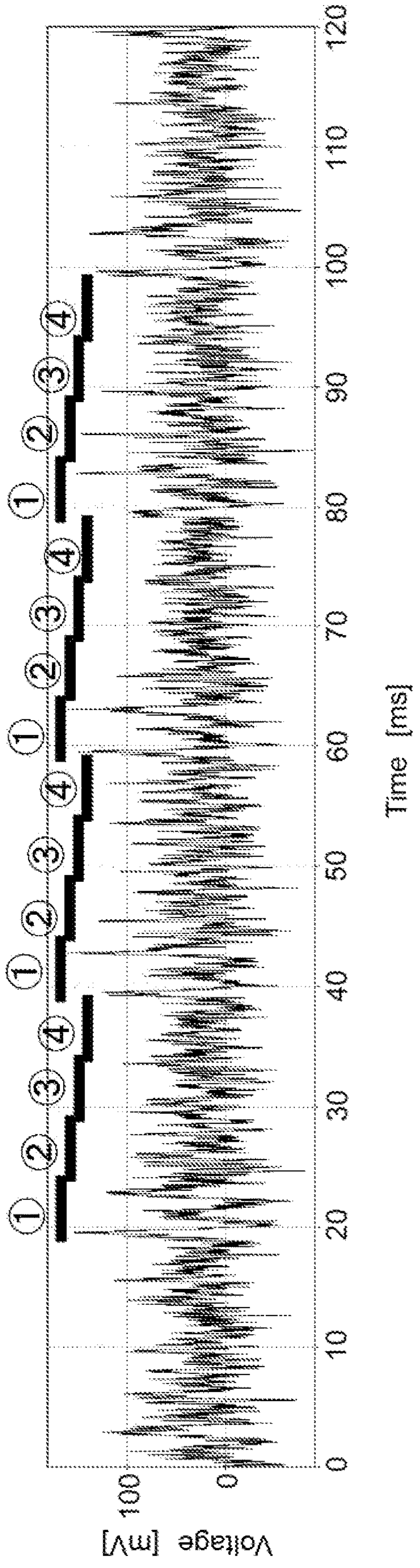
FIG. 20 is a diagram of the feature of the measured engine sound in electrically connected condition.
Figure 21A:
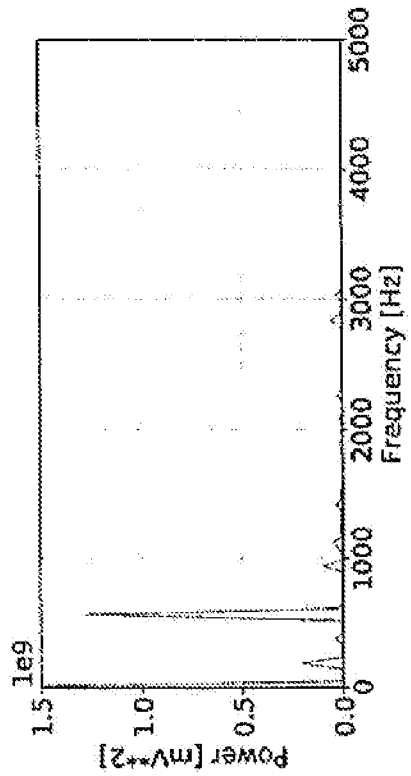
FIG. 21A is a diagram of the feature of the power spectrum deduced from FIG. 20 (induction process).
Figure 21B:
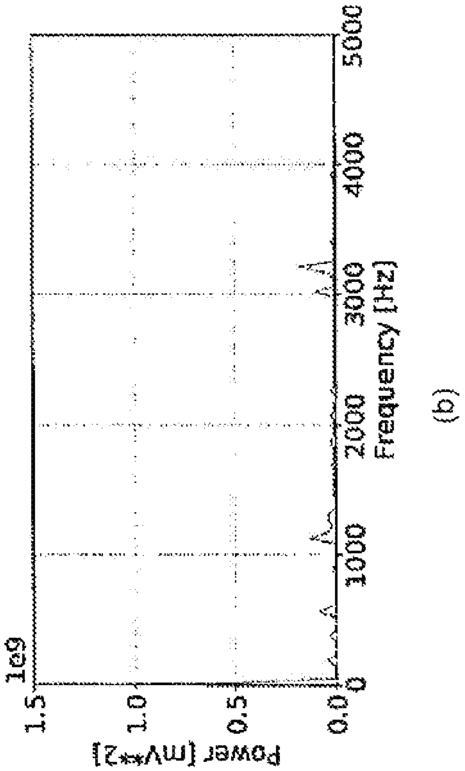
FIG. 21B is a diagram of the feature of the power spectrum deduced from FIG. 20 (compression process).
Figure 21C:
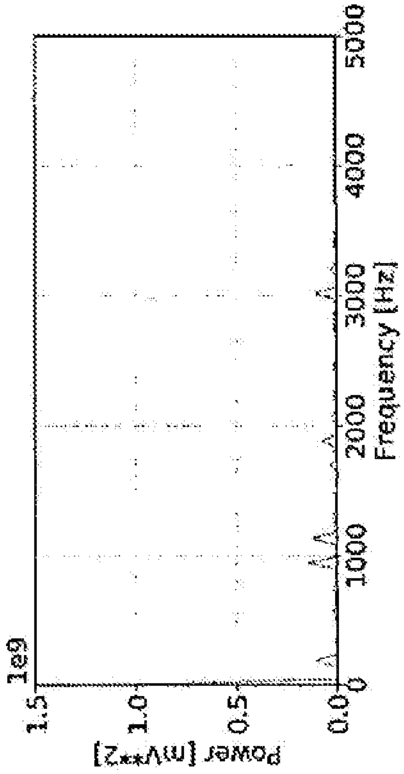
FIG. 21C is a diagram of the feature of the power spectrum deduced from FIG. 20 (combustion process).
Figure 21D:
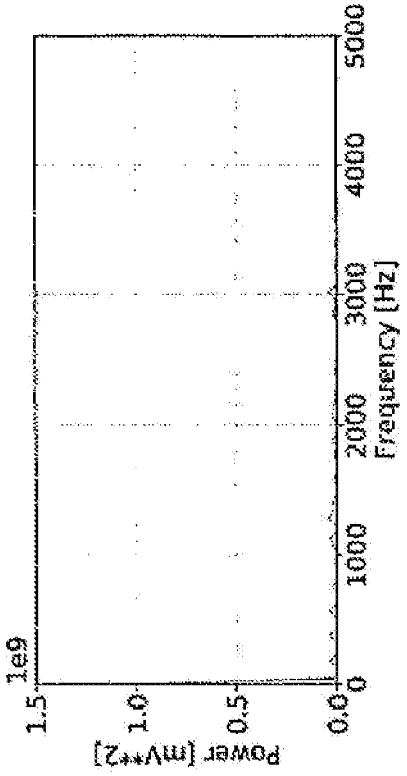
FIG. 21D is a diagram of the feature of the power spectrum deduced from FIG. 20 (exhaustion process).

FIG. 20 shows the spectrum of engine sound (waveform) in the electrically connected condition between the injector and the engine of the motorcycle (KTM 390 DUKE) and the dependence of the power of engine sound on frequency (power spectrum) is shown in FIG. 21A for induction process, FIG. 21B for compression process, FIG. 21C for combustion process and FIG. 21D for exhaustion process. (In FIG. 20, the horizontal bars above the waveform indicate the intervals in the order from the high to the low for (1) induction process, (2) compression process, (3) combustion process and (4) exhaustion process in the order from high to low. The spectrum analysis was made on four times of these four process.)

The starting times of the induction process are summarized in FIG. 27.

Making a comparison of these results, the following facts are found for the motorcycles (HONDA MEN 450 and KTM 390 DUKE) both in the insulated condition and in the electrically connected condition:

(1) The starting time of the induction process (opening of the intake valve) are at almost the same phase in the waveform (engine sound spectrum).

(2) If the engine is an identical, the difference in the distribution of frequency in the induction process is small. The initial assumptions are proved to be adequate.

The results of making a comparison between in the insulated condition and in the electrically connected condition of the motorcycle (HONDA MEN 450) are itemized:

(a) The differences between the starting time of induction process obtained from engine sound and the starting time of the pulse vibration indicating the first ejection of a droplet obtained from the measurements of potential are 0.3 ms in the insulated condition and −0.3 ms in the electrically connected condition. Since the detecting time of the engine sound delayed to the electrical signal by about 1 ms, the practical differences in time are 1.3 ms and 0.9 ms, respectively.

(b) In the compression process, the power is larger in the insulated condition than that in the electrically connected condition.

(c) In combustion process, the power in the electrically connected condition is remarkably larger than that in the insulated condition.

(d) In the exhaustion process, the power is remarkably larger in the insulated condition than in the electrically connected condition.

Taking the results of the measurements of potential difference into consideration, these results can be interpreted as below:

(1) At the compression process, the power in the isolated condition is larger than that in the electrically connected condition, which is assumed that the gasoline left in the intake tube in the insulated condition is assumed to be more than that in the electrically connected condition and reach the exhausting system passing through the cylinder when both the intake valve and the exhaust one are open simultaneously and then burns at the compression process.

(2) The power in the electrically connected condition is larger than that in the isolated condition at the combustion process, however, lower at the exhaustion process, which is assumed that the amount of the gasoline put into the cylinder is more and the ratio of combustion is larger in the electrically connected condition.

(3) At the exhaustion process, the power in the insulated condition is larger than that in the electrically connected condition, which is assumed that the amount of the un-burned gasoline is more in the insulated condition and it burns in the cylinder or the exhaust tube at the exhaustion process.

Therefore, to increase the ratio of the fuel put into the cylinder by reducing the delay of ejecting time of fuel droplets and to increase the ratio of combustion by promoting the evaporation of the fuel droplets in the cylinder should be the crucial factors to actualize large output and torque by improving the thermal efficiency of the engine with an indirect ejection type fuel ejector.

The measurements of output and torque were performed for a motorcycle (KTM 390 DUKE) using a dynamometer (Dynojet 250ix), whose results were compared between in the isolated condition and in the electrically connected, which are shown in FIG. 28. The rotation rate of an engine was 6000 rpm together in the isolated condition and in the electrically connected condition. In the electrically connected condition, the output and the torque increased by about 50% as compared to the insulated condition. Making the comparison the power of the sound of the engine in the insulated condition with that in the connected condition, the latter is seen a little bit larger than the former except the component at 150 Hz. (see the induction processes in FIG. 21A and FIG. 43A).

C Ejecting Time/Arriving Time of Droplets and Crank Angle

Figure 22:
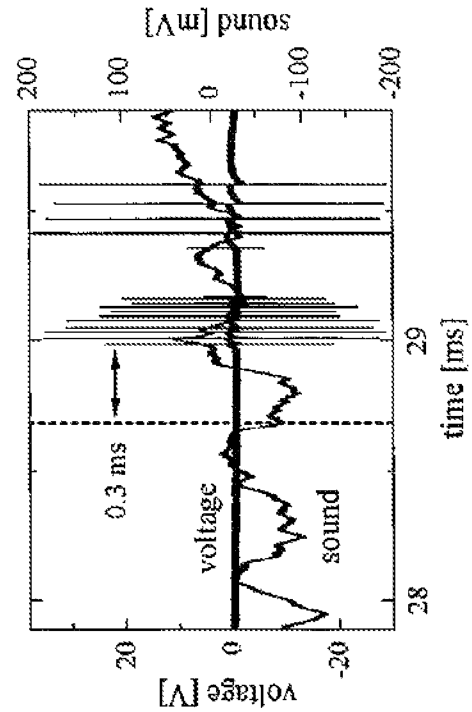
FIG. 22 is a diagram of the feature of droplet ejecting time and arriving time.
Figure 23:
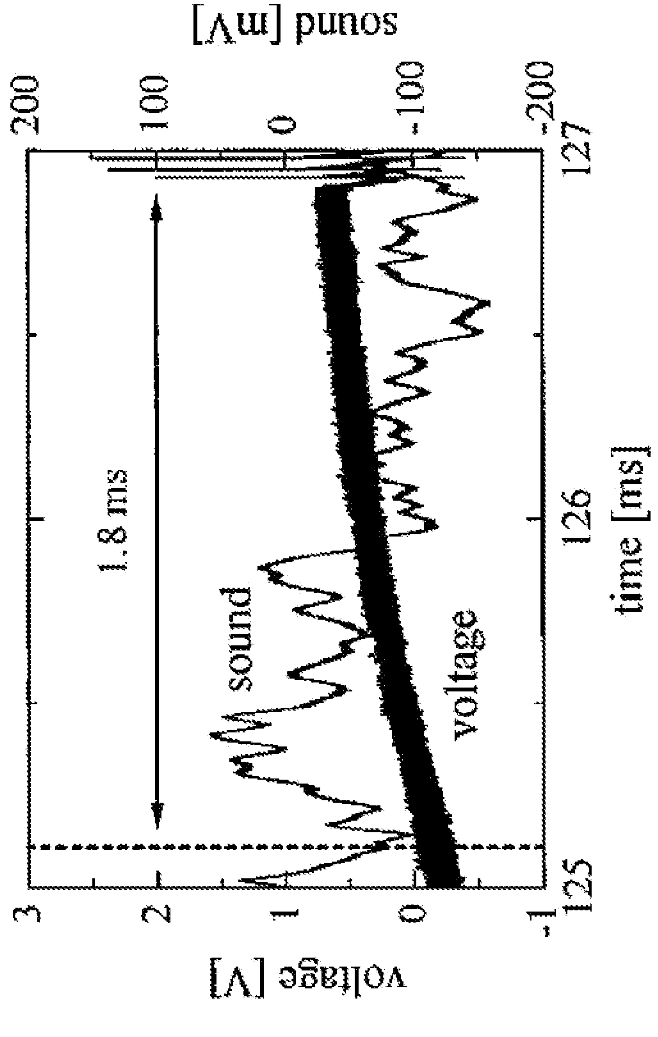
FIG. 23 is a diagram of the feature of droplet ejecting time and arriving time.
Figure 24:
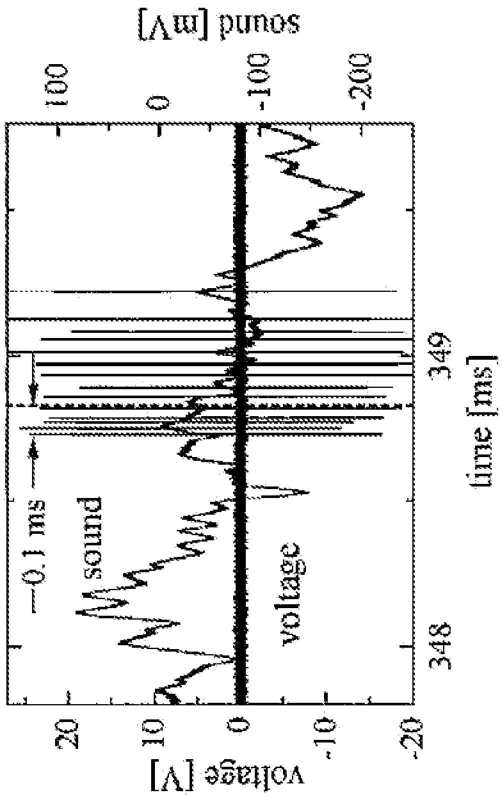
FIG. 24 is a diagram of the feature of droplet ejecting time and arriving time.

In order to compare the starting time of the induction process with the ejecting time and the arriving time of droplets, the results of the measurements of potential and the waveform of engine sound are superimposed and shown in FIG. 22 to FIG. 24. (FIG. 22 shows the changes in the potential of the fuel ejector (injector) and the sound of the engine in the condition where the injector was insulated from the engine. FIG. 23 shows the changes of the potential of the engine and the sound of the engine in the condition where the injector was insulated from the engine. FIG. 24 shows the changes of the potential of the fuel ejector (injector) and the sound of the engine in the condition where the injector was electrically connected with the engine. Note that the sound of the engine was detected with a delay about 1 ms.) The broken line in the figures indicates the starting time of the induction process obtained from the data of the engine sound according to the procedure described in "B Measurements of Engine Sound".

In FIG. 22 which shows the potential of an injector in the isolated condition, a group of perpendicular lines is seen in the interval from 29 ms to 29.5 ms. These lines are the impulses indicating the ejection of droplets. In FIG. 23 where the changes in the potential of the engine are shown, some perpendicular lines indicate the end of the arrival of the droplets. In FIG. 24 where the changes in potential in the condition of the injector connected to the engine are shown, the starting time of the induction process is indicated by a broken line between the perpendicular lines. In these three figures, thick lines indicating the impulses of potential and thin lines indicating the noises on the waveform resulted from these impulses are overlapped. The difference between the starting time of the induction process and the ejecting time of the droplets is obviously reduced by electrically connecting between the injector and the engine.

Figure 25:
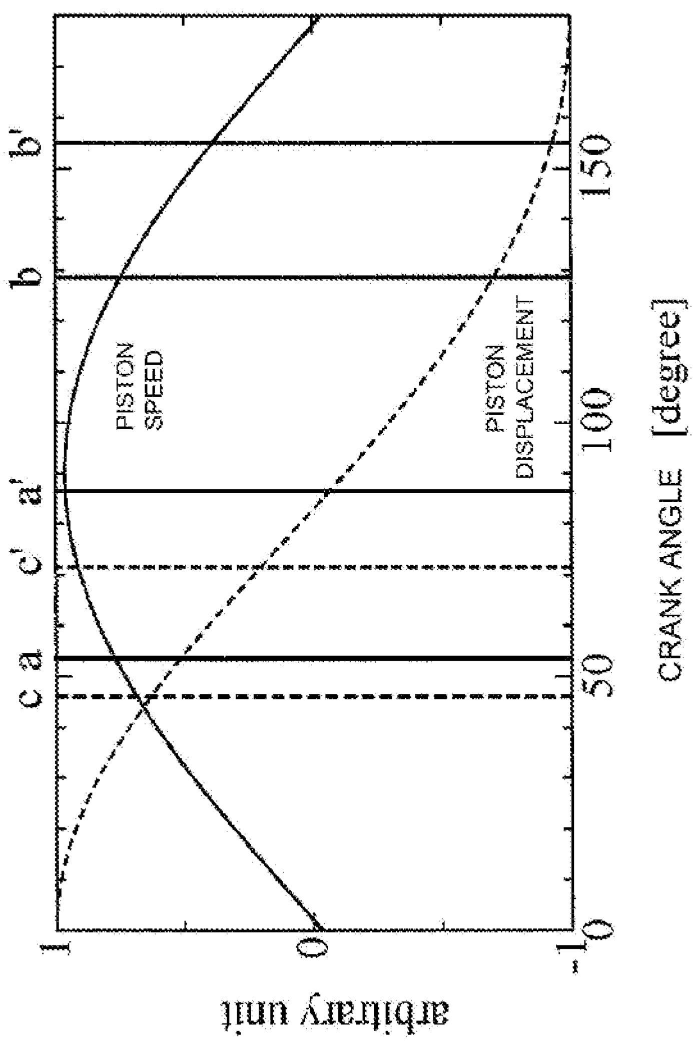
FIG. 25 is a diagram of the feature of droplet ejecting time and arriving time.
Figure 26:
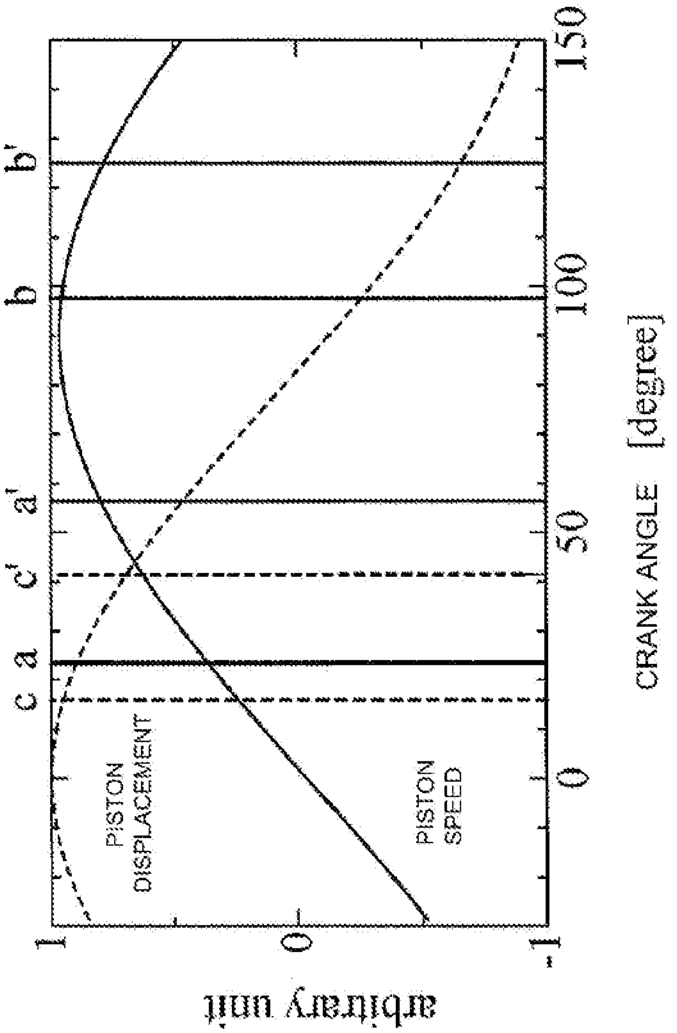
FIG. 26 is a diagram of the feature of droplet ejecting time and arriving time.

Summary of the results are shown in FIG. 27. For reference, the results for the KTM 390 DUKE are also shown. In FIG. 27, the corrected value of the delay in detecting sound (about 1 ms) is also noted. The ejecting time and arriving time in the table mean the range of ejecting time and the range of arriving time of the droplets at the cylinder derived from the FIG. 37-FIG. 39. It is not simple to compare by time since the rotation rate of engine differs in each measurements, therefore the results of the comparison by the angle of the crank are shown in FIG. 25 and FIG. 26. (In FIG. 25 and FIG. 26, a and a' indicate starting time and ending time of ejection of droplets in the isolated condition, respectively, b and b' indicate arriving time and ending time of arrived droplets in the isolated condition, respectively, c and c' indicate starting time and ending time of ejection of droplets in the electrically connected condition, respectively.)

In FIG. 25, the starting time of the induction process is supposed to be at the moment when the piston is at the top dead center. Assuming that both the intake valve and the exhaust valve are open in the range from −30° to 30° centered by the top dead center, at the beginning of the ejection of the fuel liquid, the exhaust valve is closed both in the insulated condition and in the electrically connected condition, therefore, the ejected fuel droplets cannot pass through the cylinder and cannot be exhausted. When ejecting time reaches the end, the displacement speed of the piston (flow speed of air) gets to almost the maximum. The droplets ejected later than this time cannot reach the cylinder, since the flow speed of air becomes low on the way.

In FIG. 26, the starting time of the induction process is defined that the position of the piston is at the angle of 30° before the top dead center. The ejection of fuel droplets has already started before the exhaust valve is shut both in the insulated condition and the electrically connected condition. Since the ending time of ejecting fuel droplets is considerably earlier than the time when the piston displacement speed (flow speed of air) reaches the maximum, most of the droplets are assumed to reach the cylinder.

In the two examples where the crank angles at the moment the intake valve open are different, it should be noted that the displacement of the piston does not reach the half of the stroke at the last ejecting time wherein the droplets can reach the cylinder. This is explained that the reduction of the pressure of the cylinder brought by the displacement of the piston to the bottom dead center is cancelled by the swelling of the air and the evaporation of a part of gasoline by heat in the cylinder, whereby the flow speed of air approaches zero.

D Summary

As mentioned above, the time required for the evaporation of droplets is longer than what has been thought. The increment of the time required for the evaporation is assumed that electrons are involved into the fuel droplets due to flow electrification. Dielectric polarization of fuel molecules by electron increases intermolecular force, so that cohesive attraction of a droplets augments. (J. N. Israelachivili, Intermolecular and Surface Forces, Ver. 2, 1996 Asakura). Therefore, for the evaporation of a charged fuel droplet is assumed to require more amount of heat than that of electrically neutral one.

Furthermore, in the case of the fuel droplets are charged, the collision probability with a cylinder inner wall, a piston surface and a cylinder head surface becomes small, whereby the amount of heat received by collision is assumed to be reduced. When the charged fuel droplets are put into the cylinder and a part of them collide with the wall surrounding, the cylinder and so forth receive electrons and decrease the potential. Therefore, the charged fuel droplets receive Coulomb repulsion from the cylinder inner wall and the piston upper surface. Even if the magnitude of the repulsion is small, the fuel droplets with a large incidence angle cannot collide with the cylinder inner wall and the piston upper surface (see FIG. 14). Consequently, the collision probability of the fuel droplets becomes smaller than that without Coulomb repulsion, whereby the time required for the acquisition of the sufficient heat for evaporation becomes long.

The power of engine sound becomes large in the condition of the injector electrically connected to the engine is explained that the amount of the fuel put into the cylinder increases, the time to acquire heat in the cylinder becomes long, and the decrease of the potential of the cylinder inner wall and so on is restrained, whereby the collision probability of the fuel droplets becomes large so that the amount of the heat given by the collisions becomes larger than that in the insulated condition.

In a direct ejection type fuel ejector, all of the ejected fuel is put into a cylinder without being lost to outside. However, the micronization and vaporization of the fuel droplets seem to be difficult due to a low flow speed of air in the cylinder as compared to that in the intake tube of the indirect fuel ejection apparatus. Therefore, the micronization of the ejected fuel droplets is significantly required for the direct ejection type fuel ejector. However, for the micronization of fuel droplets, the ejection through a micronized orifice applying a large pressure onto the fuel liquid using a high pressure pump is required. Therefore, the effects of flow electrification in the direct ejection type fuel ejector must be more remarkable than that in the indirect ejection type fuel ejector.

The foresaid, referring to the practical applications, the embodiments of the present invention have been explained.

The objects of the present invention are to offer an efficient droplet ejector with controlling the effects of flow electrification, therefore, the droplet ejector with controlling the effects of flow electrification comprehends not only the inventions described in the claims 1-claim 6 but also, for examples, the inventions whose construction is explained in the examples above.

As for examples, a droplet ejector characterized by equipment with an ejection port in front of which an electrode is placed, whereto voltage is applied, whereby negatively charged liquid is accelerated and micro-droplets ejected from the ejection port above mentioned, A droplet ejector characterized by equipment with an ejection port, wherein an electrode or electrodes are placed, whereto voltage is applied to change the potential, whereby electrons in a pressurized liquid are vibrated and ejected, and the volume of the liquid is controlled by adjusting the timing of ejection with the potential.

A droplet ejector characterized by equipment with an ejection port, wherein positive voltage is applied to the target object, whereby Coulomb attraction acts on the negatively charged micro-droplets so that the probability of collision with the target object above mentioned is increased, A droplet ejector characterized by equipment with an ejection port in order to promote thermal efficiency of the target object by facilitating the evaporation of the liquid, and also an actuator wherein the liquid is accelerated by a vibration plate, a sensor which receives signals, such as the volume of flowing air, the rotation rate of the engine, the temperature of cooling water, the ratio of throttle opening and the voltage of a battery and so on from the detectors, and a controller to adjust the ejection volume of the liquid based on the information from the sensors above mentioned, whereby micro-droplets with a diameter of 50 μm or less are ejected from an ejection port with plural ejection orifices of 50 μm or less in diameter.

Each of these droplet ejector can eject micro-droplets efficiently.

EXPLANATION OF REFERENCE NUMERALS

10 body
20 droplets
21 fuel liquid
30 lead wire
41 high pressure pump
411 valve A
412 valve B
42 lifter
421 top dead center
422 bottom dead center
43 cam
44 reservoir
441 valve C
45 insulator
452 insulation material
46 battery
51 controller
52 ejection cell
521 pressure chamber
53 actuator
531 piezoelectric element
532 vibration plate
54 sensor
56 refueling pump
561 gasoline tank
61 ejection port
611 ejection orifice
62 cylinder
621 cylinder head
622 inner wall
63 intake tube
64 electrode
641 conduction ring
642 electrode 1
643 electrode 2
70 fuel ejector
701 MEMS type fuel ejector
72 electrical vibration chopper

The invention claimed is:

1. A droplet ejector for an internal combustion engine having an ejection port for ejecting droplets of liquid fuel, wherein:

the ejection port has one or more ejection orifice for ejecting the droplets, and the ejection port or the droplet ejector is electrically connected directly to the combustion chamber of the internal combustion engine by a conductor for suppressing potential increase of the ejection port due to flow electrification, and electrostatic capacity of the ejection port or the droplet ejector is made larger than that in the condition un-connected with the combustion chamber.

2. A droplet ejector of claim 1, wherein:

the droplet ejector further comprises an electrode arranged in a ring shape in front of the ejection port, and the droplets ejected from the ejection port are accelerated by electric field formed by applying voltage to the electrode and pass through a hollow portion of the ring-shaped electrode.

3. A droplet ejector of claim 1, wherein:

the ejection port has one or more electrode therein for controlling the ejection of the liquid fuel, and the potential of the electrode is altered for controlling the ejecting timing and the amount of the ejected liquid which is pressurized to be ejected from the ejection port.

4. A droplet ejector of claim 1, wherein:

positive voltage is applied by the droplet ejector to the combustion chamber for increasing collision probability between the droplets negatively charged due to flow electrification and the combustion chamber.

5. A droplet ejector of claim 1, wherein:

a system for ejecting the droplets from the ejection port comprises a pressure chamber in communication with the ejection port, a vibration plate for changing the volume of the pressure chamber, an actuator for driving the vibration plate, a controller for regulating driving of the actuator and a sensor for conveying information about a vehicle to the controller, and the controller regulates the actuator based on the information from the sensor for oscillating the vibration plate so that the droplets of the liquid fuel accommodated in the pressure chamber are ejected from the ejection port having ejection orifices of 50 μm or less in diameter so as to make the diameter of the droplets to be 50 μm or less.

* * * * *